US007065338B2

(12) United States Patent
Mano et al.

(10) Patent No.: US 7,065,338 B2
(45) Date of Patent: Jun. 20, 2006

(54) METHOD, DEVICE AND PROGRAM FOR CODING AND DECODING ACOUSTIC PARAMETER, AND METHOD, DEVICE AND PROGRAM FOR CODING AND DECODING SOUND

(75) Inventors: Kazunori Mano, Tokyo (JP); Yusuke Hiwasaki, Tokyo (JP); Hiroyuki Ehara, Kanagawa (JP); Kazutoshi Yasunaga, Kanagawa (JP)

(73) Assignees: Nippon Telegraph and Telephone Corporation, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 495 days.

(21) Appl. No.: 10/432,722

(22) PCT Filed: Nov. 27, 2001

(86) PCT No.: PCT/JP01/10332

§ 371 (c)(1),
(2), (4) Date: May 27, 2003

(87) PCT Pub. No.: WO02/43052

PCT Pub. Date: May 30, 2002

(65) Prior Publication Data

US 2004/0023677 A1 Feb. 5, 2004

(30) Foreign Application Priority Data

Nov. 27, 2000 (JP) ............................ 2000-359311

(51) Int. Cl.
*H04B 1/26* (2006.01)

(52) U.S. Cl. .................. 455/313; 455/67.13; 455/131; 455/130; 704/222; 704/214

(58) Field of Classification Search ................ 455/313, 455/67.13, 20, 21, 22, 23, 131, 63.1; 704/222, 704/214, 208
See application file for complete search history.

(56) References Cited

U.S. PATENT DOCUMENTS

| | | | | | |
|---|---|---|---|---|---|
| 4,896,361 | A | * | 1/1990 | Gerson | 704/222 |
| 5,271,089 | A | * | 12/1993 | Ozawa | 704/222 |
| 5,323,486 | A | * | 6/1994 | Taniguchi et al. | 704/222 |
| 5,396,576 | A | * | 3/1995 | Miki et al. | 704/222 |
| 5,487,128 | A | * | 1/1996 | Ozawa | 704/222 |
| 5,717,824 | A | | 2/1998 | Chhatwal | |

(Continued)

FOREIGN PATENT DOCUMENTS

EP 0 967 594 A1 12/1999

(Continued)

OTHER PUBLICATIONS

Hiroyuki Ehara, et al., "A high Quality 4-kbits/s Speech Coding Algorithm Based on MDP-CELP", VTC2000, vol. 2 of 3, Conf. 51, XP-000968135, May 15, 2000, pp. 1572-1576.

*Primary Examiner*—Matthew Anderson
*Assistant Examiner*—Minh Dao
(74) *Attorney, Agent, or Firm*—Oblon, Spivak, McClelland, Maier & Neustadt, P.C.

(57) ABSTRACT

In coding and decoding an acoustic parameter, a weighted vector is generated by multiplying a code vector output in a past frame and a code vector selected in a present frame by weighting factors respectively selected from a factor code book and adding the products to each other.

49 Claims, 12 Drawing Sheets

U.S. PATENT DOCUMENTS

| | | | | | |
|---|---|---|---|---|---|
| 5,727,122 | A * | 3/1998 | Hosoda et al. | .............. | 704/223 |
| 5,799,131 | A * | 8/1998 | Taniguchi et al. | .......... | 704/204 |
| 5,819,213 | A * | 10/1998 | Oshikiri et al. | ............. | 704/222 |
| 2005/0096902 | A1* | 5/2005 | Kondo et al. | ............... | 704/222 |

FOREIGN PATENT DOCUMENTS

| | | |
|---|---|---|
| JP | 5-73097 | 3/1993 |
| JP | 5-113800 | 5/1993 |
| JP | 6-118999 | 4/1994 |
| JP | 6-175695 | 6/1994 |
| JP | 6-282298 | 10/1994 |
| JP | 8-44400 | 2/1996 |
| JP | 11-136133 | 5/1999 |
| WO | WO 00/11650 | 3/2000 |

* cited by examiner

METHOD, DEVICE AND PROGRAM FOR CODING AND DECODING ACOUSTIC PARAMETER, AND METHOD, DEVICE AND PROGRAM FOR CODING AND DECODING SOUND

TECHNICAL FIELD

This invention relates to methods of coding and decoding low-bit rate acoustic signals in the mobile communication system and Internet wherein acoustic signals, such as speech signals and music signals, are encoded and transmitted, and also relates to acoustic parameter coding and decoding methods and devices applied thereto, and programs for conducting these methods by a computer.

PRIOR ART

In the fields of digital mobile communication and speech storage, in order to effectively utilize radio waves and storage media, there have been used speech coding devices wherein the speech information is compressed and encoded with high efficiency. In these speech coding devices, in order to express the high-quality speech signals even at the low bit rate, there has been employed a system using a model suitable for expressing the speech signals. As a system which has been widely in actual use at the bit rates in the range of 4 kbit/s to 8 kbit/s, for example, CELP (Code Excited Linear Prediction: Code Excited Linear Prediction Coding) system can be named. The art of CELP has been disclosed in M. R. Schroeder and B. S. Atal: "Code-Excited Linear Prediction (CELP): High-quality Speech at Very Low Bit Rates", Proc. ICASSP-85, 25.1.1, pp.937–940, 1985".

The CELP type speech coding system is based on a speech synthetic model corresponding to a vocal tract mechanism of human being, and a filter expressed by a linear predictive coefficient indicating a vocal tract characteristics and an excitation signal for driving the filter synthesize the speech signal. More particularly, a digitalized speech signal is delimited by every certain length of a frame (about 5 ms to 50 ms) to carry out the linear prediction of the speech signal for every frame, so that a predicted residual error (excitation signal) is encoded by using an adaptive code vector formed of a known waveform and a fixed code vector. The adaptive code vector is stored in an adaptive codebook as a vector which expresses a driving sound source signal generated in the past, and is used for expressing periodic components of the speech signal. The fixed code vector is stored in a fixed codebook as a vector prepared in advance and having a predetermined number of waveforms, and the fixed code vector is used for mainly expressing aperiodic components which can not be expressed by the adaptive codebook. As the vector stored in the fixed codebook, a vector formed of a random noise sequence and a vector expressed by a combination of several pulses are used.

As a representative example of the fixed codebooks that express the fixed code vectors by the combination of several pulses, there is an algebraic fixed codebook. More specific contents of the algebraic fixed codebook are shown in "ITU-T Recommendation G. 729" and the like.

In the conventional speech coding system, the linear predictive coefficients of the speech are converted into parameters, such as partial autocorrelation (PARCOR) coefficients and line spectrum pairs (LSP: Line Spectrum Pairs, also called as line spectrum frequencies), and quantized further to be converted into the digital codes, and then they are stored or transmitted. The details of these methods are described in "Digital Speech Processing" (Tokai University Press) written by Sadaoki Furui, for example.

In the coding of the linear predictive coefficients, as a method of coding the LSP parameter, a quantized parameter of the current frame is expressed by a weighted vector in which a code vector outputted from the vector codebook in a one or more frames in the past is multiplied by a weighting coefficient selected from a weighting coefficient codebook, or a vector in which a mean vector, found in advance, of the LSP parameter in the entire speech signal is added to this vector, and a code vector which should be outputted by the vector codebook and a set of weighting coefficients that should be outputted by the weighting coefficient codebook are selected such that a distortion with respect to the LSP parameter found from an input speech in the quantized parameter, that is, the quantization distortion becomes minimum or small enough. Then, they are outputted as codes of the LSP parameter.

This is generally called a weighted vector quantization, or supposing that the weighting coefficients are considered as the predictive coefficients from the past, it is called a moving average (MA: Moving Average) prediction vector quantization.

In a decoding side, from the received vector code and the weighting coefficient code, the code vector in the current frame and the past code vector are multiplied by the weighting coefficient, or, a vector, in which the mean vector, found in advance, of the LSP parameter in the entire speech signal is added further, is outputted as a quantized vector in the current frame.

As a vector codebook that outputs the code vector in each frame, there can be structured a basic one-stage vector quantizer, a split vector quantizer wherein dimensions of the vector are divided, a multi stage vector quantizer having two or more stages, or a multi-stage and split vector quantizer in which the multi stage vector quantizer and the split vector quantizer are combined.

In the aforementioned conventional LSP parameter encoder and decoder, since the number of frames is large in a silent interval and a stationary noise interval, and in addition, since the coding process and decoding process are configured in multi stages, it was not always possible to output the vector such that the parameter synthesized in correspondence with the silent interval and the stationary noise interval can be changed smoothly. This is because of the following reasons. Normally, the vector codebook used for coding was found by learning, but since learned speeches did not contain enough amount of the silent interval or the stationary noise interval upon this learning, the vector corresponding to the silent interval or the stationary noise interval was not always reflected enough to learn, or if the number of bits given to the quantizer was small, it was impossible to design the codebook including sufficient quantized vectors corresponding to non-voice intervals.

In these LSP parameter encoder and decoder, upon coding at the time of actual communication, the quantization performance during the non-voice interval could not be fully exhibited, and a deterioration of the quality as the reproduced sound was inevitable. Also, these problems occurred not only in the coding of the acoustic parameter equivalent to the linear predictive coefficient expressing a spectrum envelope of the speech signal, but also in the similar coding with respect to a music signal.

The present invention has been made in view of the foregoing points, and an object of the invention is to provide acoustic parameter coding and decoding methods and devices, wherein outputting the vectors equivalent to the silent interval and the stationary noise interval is facilitated so that the deterioration of the quality is scarce at these intervals in the conventional coding and decoding of the acoustic parameter equivalent to the linear predictive coefficient expressing a spectrum envelope of the acoustic signal, and also to provide acoustic signal coding and decoding methods and devices using the aforementioned methods and devices, and a program for conducting these methods by a computer.

DISCLOSURE OF THE INVENTION

The present invention is mainly characterized in that in coding and decoding of an acoustic parameter equivalent to a linear predictive coefficient showing a spectrum envelope of an acoustic signal, that is, a parameter such as an LSP parameter, α parameter, PARCOR parameter or the like (hereinafter simply referred to as an acoustic parameter), an acoustic parameter vector code a substantially flat spectrum envelope corresponding to a silent interval or stationary noise interval, which can not originally obtained by learning by a Codebook, and added to a vector codebook, to thereby be selectable. The present invention is different from the prior art in that a vector including a component of the acoustic parameter vector showing the substantially flat spectrum envelope is obtained in advance by calculation and stored as one of the vectors of the vector codebook, and in a multi-stage quantization configuration and a split vector quantization configuration, the aforementioned code vector is outputted.

An acoustic parameter coding method according to the present invention comprises:

(a) a step of calculating an acoustic parameter equivalent to a linear predictive coefficient showing a spectrum envelope characteristic of an acoustic signal for every frame of a predetermined length of time;

(b) a step of multiplying a code vector outputted in at least one frame in the closest past selected from a vector codebook for storing a plurality of code vectors in correspondence with an index representing the code vectors and a code vector selected in a current frame respectively with a set of weighting coefficients selected from a coefficient codebook for storing one or more sets of weighting coefficients in correspondence with an index representing the weighting coefficients, wherein multiplied results are added to generate a weighted vector and a vector including a component of the weighted vector is found as a candidate of a quantized acoustic parameter with respect to the acoustic parameter of the current frame; and (c) a step of determining the code vector of the vector codebook and the set of the weighting coefficients of the coefficient codebook by using a criterion such that a distortion of the candidate of the quantized acoustic parameter with respect to the calculated acoustic parameter becomes a minimum, wherein an index showing the determined code vector and the determined set of the weighting coefficients are determined and outputted as a quantized code of the acoustic parameter; and the vector codebook includes a vector having a component of an acoustic parameter vector showing the aforementioned substantially flat spectrum envelope as one of the stored code vectors.

An acoustic parameter decoding method according to the present invention comprises:

(a) a step of outputting a code vector corresponding to an index expressed by a code inputted for every frame and a set of weighting coefficients from a vector codebook, which stores a plurality of code vectors of an acoustic parameter equivalent to a linear predictive coefficient showing a spectrum envelope characteristic of an acoustic signal in correspondence with an index representing the code vectors, and a coefficient codebook, which stores one or more sets of weighting coefficients in correspondence with an index representing the sets; and (b) a step of multiplying the code vector outputted from the vector codebook in at least one frame of the closest past and a code vector outputted from the vector codebook in a current frame respectively with the outputted set of the weighting coefficients, and adding multiplied results together to thereby generate a weighted vector, wherein a vector including a component of the weighted vector is outputted as a decoded quantized vector of the current frame; and the vector codebook includes a vector having a component of an acoustic parameter vector showing a substantially flat spectrum envelope as one of the code vectors stored therein.

An acoustic parameter coding device according to the present invention comprises:

parameter calculating means for analyzing an input acoustic signal for every frame and calculating an acoustic parameter equivalent to a linear predictive coefficient showing a spectrum envelope characteristic of the acoustic signal;

a vector codebook for storing a plurality of code vectors in correspondence with an index representing the vectors;

a coefficient codebook for storing one or more sets of weighting coefficients in correspondence with an index representing the coefficients;

quantized parameter generating means for multiplying a code vector with respect to a current frame outputted from the vector codebook and a code vector outputted in at least one frame of the closest past respectively with the set of the weighting coefficients selected from the coefficient codebook, the quantized parameter generating means adding results together to thereby generate a weighted vector, the quantized parameter generating means outputting a vector including a component of the generated weighted vector as a candidate of a quantized acoustic parameter with respect to the acoustic parameter in the current frame;

a distortion computing part for computing a distortion of the quantized acoustic parameter with respect to the acoustic parameter calculated at the parameter calculating means; and it is configured that a codebook search controlling part for determining the code vector of the vector codebook and the set of the weighing coefficients of the coefficient codebook by using a criterion such that the distortion becomes small, the codebook search controlling part outputting indexes respectively representing the determined code vector and the set of the weighting coefficients as codes of the acoustic parameter; and the vector codebook includes a vector having a component of an acoustic parameter vector showing a substantially flat spectrum envelope.

An acoustic parameter decoding device according to the present invention is configured to comprise:

a vector codebook for storing a plurality of code vectors of an acoustic parameter equivalent to a linear predictive coefficient showing a spectrum envelope characteristic of an acoustic signal in correspondence with an index representing the code vectors, a coefficient codebook for storing one or more sets of weighting coefficients in correspondence with an index representing the weighting coefficients, and quantized parameter generating means for outputting one code vector from the vector codebook in correspondence with an index showing a code inputted for every frame, to thereby output a set of weighting coefficients from the coefficient codebook, the quantized parameter generating means multiplying the code vector outputted in a current frame and a code vector outputted in at least one frame of the closest past respectively with the set of the weighting coefficients outputted in the current frame, the quantized parameter generating means adding multiplied results together to thereby generate a weighted vector and outputting a vector including a component of the generated weighted vector as a decoded quantized acoustic parameter of the current frame; and the vector codebook stores a vector including a component of an acoustic parameter showing a substantially flat spectrum envelope as one of the code vectors.

An acoustic signal coding device for encoding an input acoustic signal according to the present invention is configured to comprise:

means for encoding a spectrum characteristic of an input acoustic signal by using the aforementioned acoustic parameter coding method;

an adaptive codebook for holding adaptive code vectors showing periodic components of the input acoustic signal therein;

a fixed codebook for storing a plurality of fixed vectors therein;

filtering means for inputting as an excitation signal a sound source vector generated based on the adaptive code vector from the adaptive codebook and the fixed vector from the fixed codebook, the filtering means synthesizing a synthesized acoustic signal by using a filter coefficient based on the quantized acoustic parameter; and means for determining an adaptive code vector and a fixed code vector respectively selected from the adaptive codebook and the fixed codebook such that a distortion of the synthesized acoustic signal with respect to the input acoustic signal becomes small, the means outputting an adaptive code and a fixed code respectively corresponding to the determined adaptive code vector and the fixed vector.

An acoustic signal decoding device for decoding an input code and outputting an acoustic signal according to the present invention is configured to comprise:

means for decoding an acoustic parameter equivalent to a linear predictive coefficient showing a spectrum envelope characteristic from an inputted code by using the aforementioned acoustic parameter decoding method;

a fixed codebook for storing a plurality of fixed vectors therein;

an adaptive codebook for holding adaptive code vectors showing periodic components of a synthesized acoustic signal therein;

means for taking out a corresponding fixed vector from the fixed codebook and taking out a corresponding adaptive code vector from the adaptive codebook by an inputted adaptive code and an inputted fixed code, the means synthesizing the vectors and generating an excitation vector; and filtering means for setting a filter coefficient based on the acoustic parameter and reproducing an acoustic signal by the excitation vector.

An acoustic signal coding method for encoding an input acoustic signal according to the present invention comprises:

(A) a step of encoding a spectrum characteristic of an input acoustic signal by using the aforementioned acoustic parameter coding method;

(B) a step of using as an excitation signal a sound source vector generated based on an adaptive code vector from an adaptive codebook for holding adaptive code vectors showing periodic components of an input acoustic signal therein and a fixed vector from a fixed codebook for storing a plurality of fixed vectors therein, and carrying out a synthesis filter process by a filter coefficient based on the quantized acoustic parameter to thereby generate a synthesized acoustic signal; and (C) a step of determining an adaptive code vector and a fixed vector selected from the fixed codebook and the adaptive codebook such that a distortion of the synthesized acoustic signal with respect to the input acoustic signal becomes small, and outputting an adaptive code and a fixed code respectively corresponding to the determined adaptive code vector and the fixed vector.

An acoustic signal decoding method for decoding input codes and outputting an acoustic signal according to the present invention comprises:

(A) a step of decoding an acoustic parameter equivalent to a linear predictive coefficient showing a spectrum envelope characteristic from inputted codes by using the aforementioned acoustic parameter decoding method;

(B) a step of taking out an adaptive code vector from an adaptive codebook for holding therein adaptive code vectors showing periodic components of an input acoustic signal by an inputted adaptive code and an inputted fixed code, taking out a corresponding fixed vector from a fixed codebook for storing a plurality of fixed vectors therein, and synthesizing the adaptive code vector and the fixed vector to thereby generate an excitation vector; and (C) a step of carrying out a synthesis filter process of the excitation vector by using a filter coefficient based on the acoustic parameter, and reproducing a synthesized acoustic signal.

The aforementioned invention can be provided in a form of a program which can be conducted in the computer.

According to the present invention, in the weighted vector quantizer (or, MA prediction vector quantizer), since a vector including a component of an acoustic parameter vector showing a substantially flat spectrum is found and stored as the code vector of the vector codebook, a quantized vector equivalent to the corresponding silent interval or the stationary noise interval can be outputted.

Also, according to another embodiment of the invention, as a configuration of a vector codebook comprised in the acoustic parameter coding device and decoding device, in the case of using a multi-stage vector codebook, a vector including a component of an acoustic parameter vector showing a substantially spectrum envelope is stored a codebook of one stage thereof, and a zero vector is stored in the codebooks of the other stages. Accordingly, an acoustic parameter equivalent to a corresponding silent interval or stationary noise interval can be outputted.

It is not always necessary to store the zero vector. In the case of not storing the zero vector, when the vector including the component of the acoustic parameter vector showing the substantially flat spectrum envelope from a codebook of one stage is selected, it will suffice that the vector including the component of the acoustic parameter vector showing the substantially flat spectrum envelope is outputted as a candidate of the code vector of the current frame.

Also, in the case that the vector codebook is formed of a split vector codebook, there are used a plurality of split vectors in which dimensions of vectors including a component of an acoustic parameter vector showing a substantially flat spectrum envelope are divided, and by divisionally storing these split vectors one by one in a plurality of split vector codebooks, respectively, when searching in the respective split vector codebooks, the respective split vectors are selected, and a vector by integrating these split vectors can be outputted as a quantized vector equivalent to the corresponding silent interval or the stationary noise interval.

Furthermore, the vector quantizer may be formed to have the multi-stage and split quantization configuration, and by combining the arts of the aforementioned multi-stage vector quantization configuration and the split vector quantization configuration, there can be outputted as the quantized vector equivalent to the acoustic parameter in correspondence with the corresponding silent interval or the stationary noise interval.

In the case that the codebook is structured as the multi-stage configuration, in correspondence with respective code vectors of the codebook at the first stage, scaling coefficients respectively corresponding to the codebooks on and after the second stage are provided as the scaling coefficient codebook. The scaling coefficients corresponding to the code vector selected at the codebook of the first stage are read out from the respective scaling coefficient codebooks, and multiplied with code vectors respectively selected from the codebook of the second stage, so that the coding with much smaller distortion of the quantization can be achieved.

As described above, the acoustic parameter coding and decoding methods and the devices in which the quality deterioration is scarce in the aforementioned interval, that is, the object of the invention, can be provided.

In the acoustic signal coding device of the invention, in the quantization of the linear predictive coefficient, any one of the aforementioned parameter coding devices is used in an acoustic parameter area equivalent to the linear predictive coefficient. According to this configuration, the same operation and effects as those of the aforementioned one can be obtained.

In the acoustic signal decoding device of the invention, in decoding of the linear predictive coefficient, any one of the aforementioned parameter coding devices is used in the acoustic parameter area equivalent to the linear predictive coefficient. According to this configuration, the same operation and effects as those of the aforementioned one can be obtained.

THE BEST MODE FOR CARRYING OUT THE INVENTION

First Embodiment

Next, embodiments of the invention will be explained with reference to the drawings.

Figure 1:
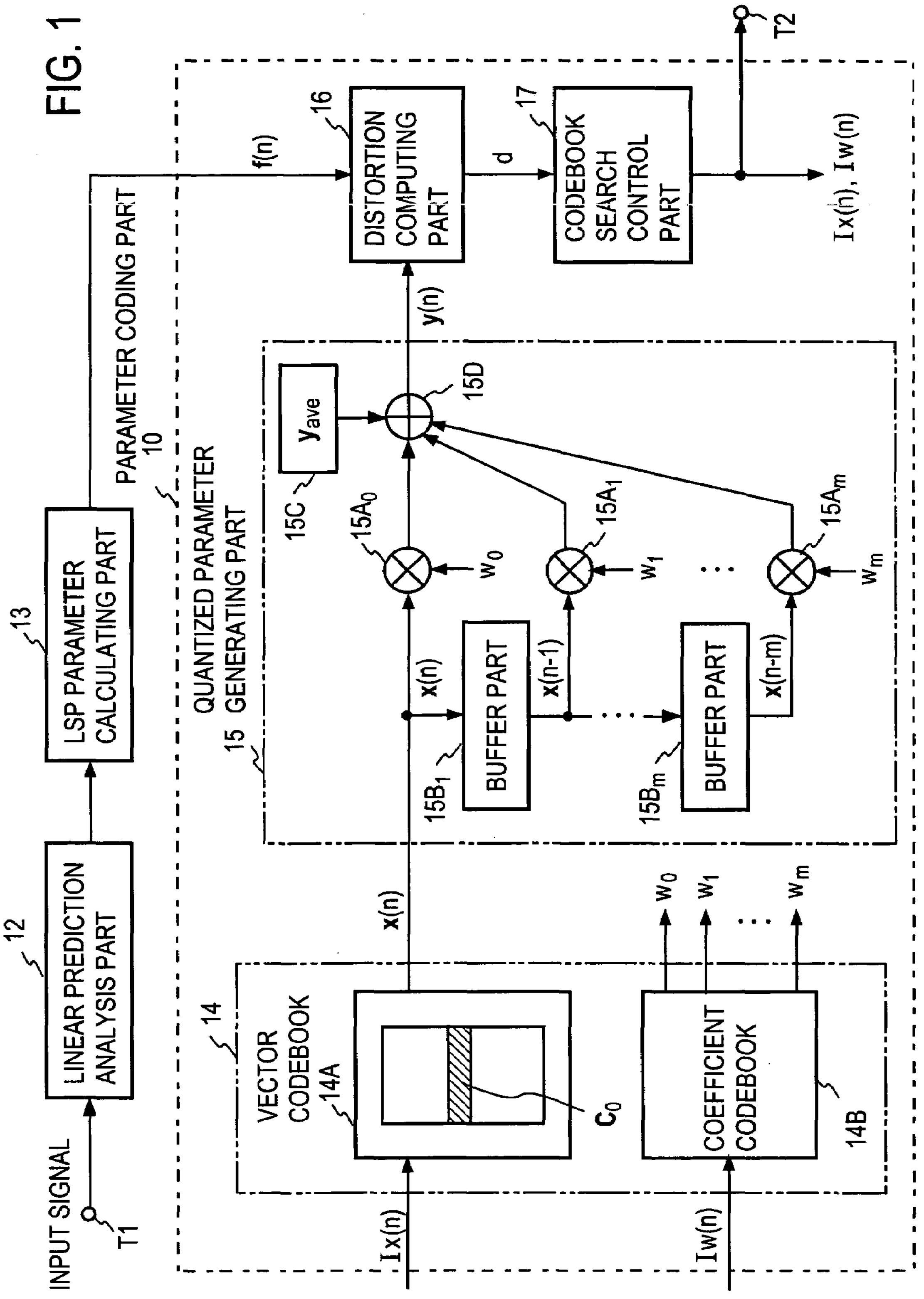
FIG. 1 is a block diagram showing a functional configuration of an acoustic parameter coding device to which a codebook according to the present invention is applied.

FIG. 1 is a block diagram showing an example of a configuration of an embodiment of an acoustic parameter coding device to which a linear predictive parameter coding method according to the present invention. The coding device is formed of a linear prediction analysis part 12; an LSP parameter calculating part 13; and a codebook 14, a quantized parameter generating part 15, a distortion computing part 16, and a codebook search control part 17, which form a parameter coding part 10. In the figure, a series of digitalized speech signal samples, for example, are inputted from an input terminal T1. In the linear prediction analysis part 12, the speech signal sample of every one frame stored in an internal buffer is subjected to the linear prediction analysis, to calculate a pair of linear predictive coefficients. Now, supposing the order of the linear prediction analysis is p-dimension, the p-dimensional, equivalent LSP (line spectrum pairs) parameter is calculated from the p-dimensional linear predictive coefficient in the LSP parameter calculating part 13. The details of the processing method thereof were described in the literature written by Furui mentioned above. The p LSP parameters are expressed as vectors as follows.

$$f(n)=(f_1(n), f_2(n), \ldots, f_p(n)) \quad (1)$$

Here, the integer n indicates a certain frame number n, and hereinafter, the frame of this number is referred to as a frame n.

The codebook 14 is provided with a vector codebook 14A, which stores n code vectors representing LSP parameter vectors found by learning, and a coefficient codebook 14B which stores a set of K weighting coefficients, and by an index Ix(n) for specifying the code vector and an index Iw(n) for specifying the weighting coefficient code, a corresponding code vector x(n) and a set of weighting coefficients ($w_0$, $w_1$, . . . , $w_m$) are outputted. The quantized parameter generating part 15 is formed of m pieces of buffer parts 15$B_1$, . . . , 15$B_m$, which are connected in series; m+1 pieces of multipliers 15$A_0$, 15$A_1$, . . . , 15$A_m$, a register 15C, and a vector adder 15D. The code vector x(n) in the current frame n which is selected as one of the candidates from the vector codebook 14A and code vectors x(n−1), . . . , x(n−m) which are determined with respect to the past frame n−1, . . . , n−m are respectively multiplied by a set of the selected weighting coefficients $w_0$, . . . , $w_m$ at the multipliers 15$A_0$, 15$A_m$, and the results of multiplications are added together at the adder 15D. Further, a mean vector $y_{ave}$, found in advance, of the LSP parameter in the entire speech signal is added to the adder 15D from the register 15C. As described above, from the adder 15D, a candidate of the quantized vector, that is, a candidate y(n) of the LSP parameter, is generated. As the mean vector $y_{ave}$, a mean vector at a voice part may be used, or a zero vector may be used as described later.

When the code vector x(n) selected from the vector codebook 14A with respect to the current frame n is substituted as $$x(n)=(x_1(n), x_2(n), \ldots, x_p(n)) \tag{2}$$

and then, similarly, the code vector determined one frame before is substituted as x(n−1); the code vector determined two frame before is substituted as x(n−2); and the code vector determined m frame before is substituted as x(n−m); a quantized vector candidate of the current frame, that is, $$y(n)=(y_1(n), y_2(n), \ldots, y_p(n)) \tag{3}$$

is expressed as follows:

$$y(n)=w_0 \cdot x(n)+\Sigma_{j=1}^{m} w_j \cdot x(n-j)+y_{ave} \tag{4}$$

Here, the larger a value of m is, the better the quantization efficiency is. However, the effect at the occurrence of a code error extends to portions after the m frame, and in addition, in case the coded and stored speech is reproduced from the middle thereof, it is necessary to go back to the m frame past. Therefore, m is adequately selected as occasion demands. For speech communication, in case of the one frame 20 ms, the value of m is sufficient if it is 6 or more, and even the value 1 to 3 may suffice. The number m is also called as the order of the moving average prediction.

The candidate y(n) of the quantization obtained as described above is sent to the distortion computing part 16, and the quantization distortion with respect to the LSP parameter f(n) calculated at the LSP parameter calculating part 13 is computed. The distortion d is defined by the weighted Euclidean distance as follows.

$$d=\Sigma_{i=1}^{p} r_i (f_i(n)-y_i(n))^2 \tag{5}$$

Incidentally, $r_i$, i=1, . . . , p are weighting coefficients found by the LSP parameter f(n), and if they are set to the weighting so as to stress on and around the formant frequency of the spectrum, the performance becomes excellent.

In the codebook search control part 17, pairs of the indexes Ix(n) and Iw(n) given to the codebook 14 are sequentially changed, and the calculation of the distortion d by the equation (5) as described above are repeated with regard to the respective pairs of the indexes, so that from the code vector of the vector codebook 14A and the set of the weighting coefficients of the vector codebook 14A in the codebook 14, the one pair thereof making the distortion d as the output from the distortion computing part 16 to be the smallest or small enough is searched, and these indexes Ix(n) and Iw(n) are sent out as the codes of the input LSP parameter from a terminal T2. The codes Ix(n) and Iw(n) sent out from the terminal T2 are sent to a decoder via a transmission channel, or stored in a memory.

When the output code vector x(n) of the current frame is determined, the code vectors x(n−j), j=1, . . . , m−1 in the buffer part 15$B_j$ of the past frame (n−j) are sequentially sent to the next buffer part 15$B_{j+1}$, and the code vector x(n) of the current frame n is inputted into the buffer 15$B_1$.

The invention is characterized in that as one of the code vectors stored the vector codebook 14A used in the coding by the weighted vector quantization of the LSP parameter described above or the moving average vector quantization, in case the mean vector $y_{ave}$ is zero, the LSP parameter vector F corresponding to the silent interval or stationary noise interval is stored, or in case $y_{ave}$ is not zero, a vector $C_0$ found by subtracting $y_{ave}$ from the LSP parameter vector F is stored. Namely, in case $y_{ave}$ is not zero, the LSP parameter vector corresponding to the silent interval or the stationary noise interval constitutes:

$$F=(F_1, F2, \ldots, F_p) \tag{6}$$

and the code vector $C_0$ which should be stored in the vector codebook 14A in FIG. 1 is calculated as follows:

$$C_0 F-y_{ave} \tag{7}$$

In the coding by the moving average prediction at the silent interval or the stationary noise interval, when the $C_0$ is selected consecutively throughout m frames, the quantized vector y(n) is found as follows:

$$\begin{aligned} y(n) &= w_0 \cdot x(n) + \sum_{j=1}^{m} w_j \cdot x(n-j) + y_{ave} \\ &= w_0 \cdot C_0 + \sum_{j=1}^{m} w_j \cdot C_0 + y_{ave} \\ &= \left( w_0 \sum_{j=1}^{m} w_j \right) \cdot C_0 + y_{ave} \end{aligned} \tag{8}$$

Here, supposing that the sum of the weighting coefficients from $w_0$ to $w_m$ is 1 or the value close thereto, y(n) can be outputted as the quantized vector F found from the LSP parameter at the silent interval or the vector close thereto, so that the coding performance at the silent interval or the stationary noise interval can be improved. By the configuration as described above, the vector including the component of the vector F is stored as one of the code vectors in the vector codebook 14A. As the code vector including the component of the vector F, in case the quantized parameter generating part 15 generates the quantized vector y(n) including the component of the mean vector $y_{ave}$, the one found by subtracting the mean vector $y_{ave}$ from the vector F is used, and in case quantized parameter generating part 15 generates the quantized vector y(n) that does not include the component of the mean vector $y_{ave}$, the vector F itself is used.

Figure 2:
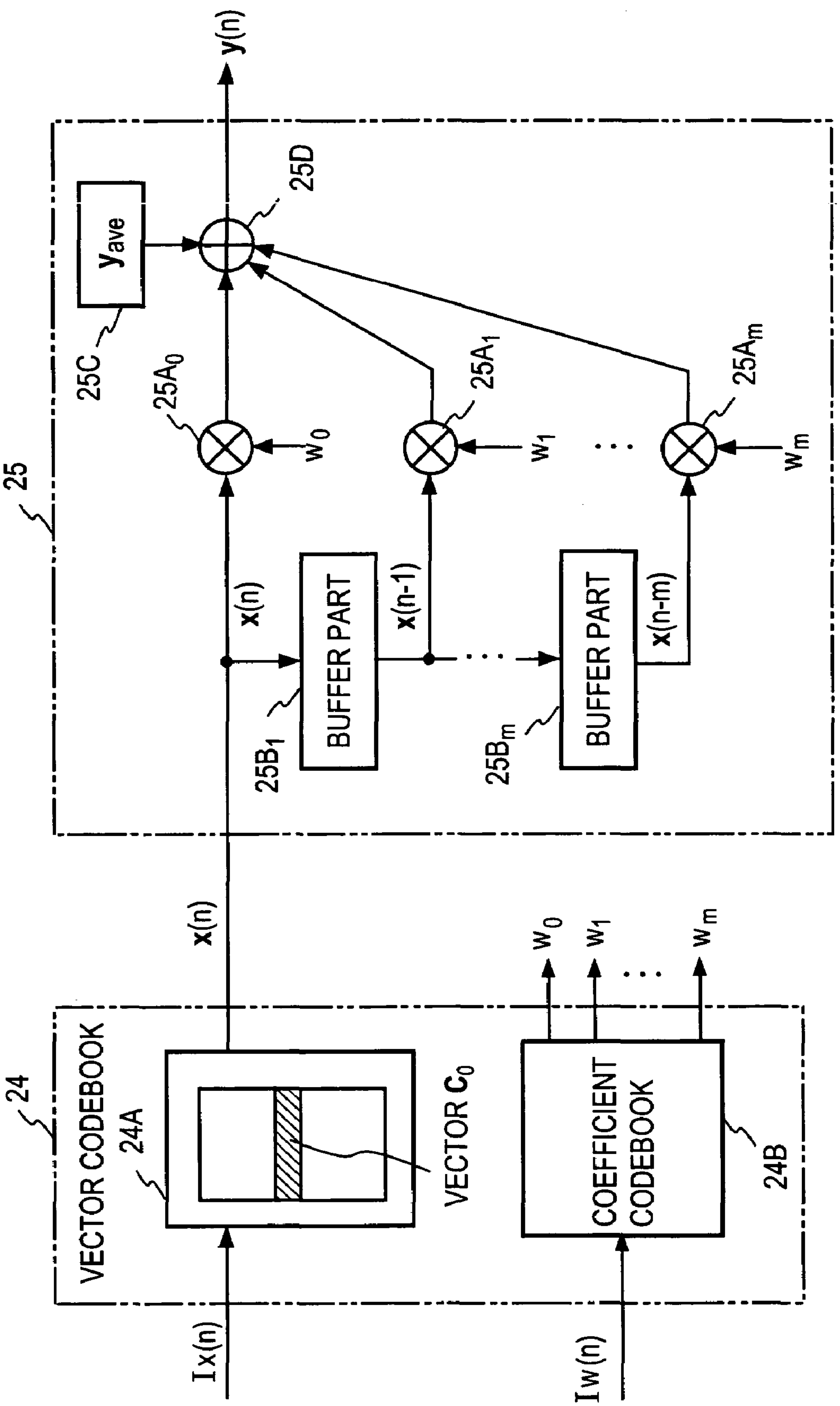
FIG. 2 is a block diagram showing a functional configuration of an acoustic parameter decoding device to which a codebook according to the present invention is applied.

FIG. 2 is an example of a configuration of a decoding device to which an embodiment of the invention is applied, and the decoding device is formed of a codebook 24 and a quantized parameter generating part 25. These codebook 24 and the quantized parameter generating part 25 are structured respectively similarly to the codebook 14 and the quantized parameter generating part 15 in FIG. 1. The indexes Ix(n) and Iw(n) as the parameter codes sent from the coding device of FIG. 1 are inputted, and the code vector x(n) corresponding to the index Ix(n) is outputted from the vector codebook 24A, and the set of weighting coefficients $w_0, w_1, \ldots, w_m$ corresponding to the index Iw(n) are outputted from the coefficient codebook 24B. The code vector x(n) respectively outputted per frame from the vector codebook 24A is sequentially inputted into buffer parts 25B$_1$, . . . , 25B$_m$, which are connected in series. The code vector x(n) of the current frame n and code vectors x(n−1), . . . , x(n−m) at 1, . . . , m frame past of the buffer parts 25B$_1$, . . . , 25B$_m$ are multiplied by weighting coefficients $w_0, w_1, \ldots, w_m$, in multipliers 25A$_0$, 25A$_1$, . . . , 25A$_m$, and these multiplied results are added together at adder 25D. Further, a mean vector $y_{ave}$ of the LSP parameter in the entire speech signal, which is held in advance in a register 25C, is added to the adder 25D, and the accordingly obtained quantized vector y(n) is outputted as a decoding LSP parameter. The vector $y_{ave}$ can be the mean vector of the voice part, or can be a zero vector z.

In the present invention, also in the decoding device, as in the coding device shown in FIG. 1, by storing the vector $C_0$ as one of the code vectors in the vector codebook 24A, the LSP parameter vector F found at the silent interval or the stationary noise interval of the acoustic signal can be outputted.

In case the mean vector $y_{ave}$ is not added at the adder 15D in FIG. 1 and at the adder 25D in FIG. 2, the LSP parameter vector F corresponding to the silent interval and the stationary noise interval is stored instead of the vector $C_0$ in the vector codebooks 14A and 24A. In the following explanations, the LSP parameter vector F or vector $C_0$ stored in the respective vector codebooks 14A and 24A are represented by and referred to as the vector $C_0$.

Figure 3:
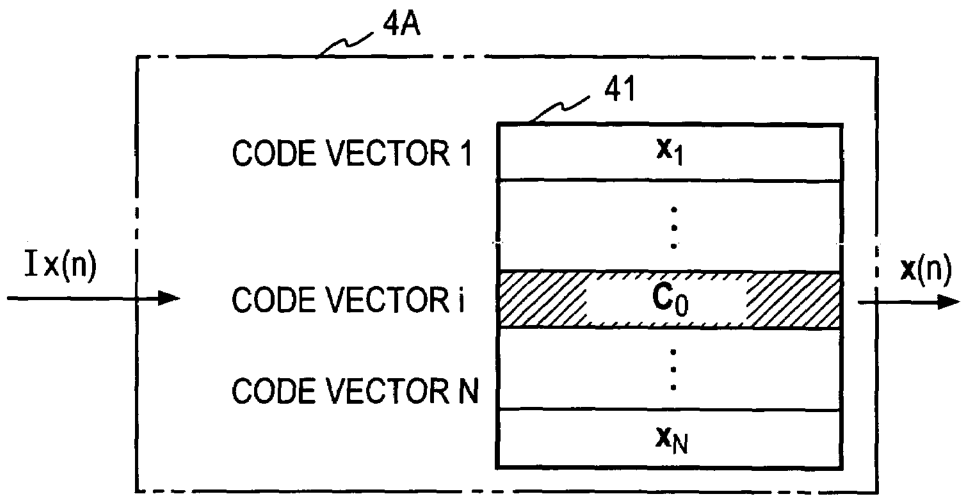
FIG. 3 is a diagram showing an example of a configuration of a vector codebook according to the present invention for LSP parameter coding and decoding.

In FIG. 3, an example of a configuration of the vector codebook 14A in FIG. 1, or the vector codebook 24A is shown as a vector codebook 4A. This example is the one in case one-stage vector codebook 41 is used. N pieces of code vectors $x_1, \ldots, x_N$ are stored as they are in the vector codebook 41, and corresponding to the inputted index Ix(n), any one of the N code vectors is selected and outputted. In the present invention, as one of the code vector x, the code vector $C_0$ is used. Although N code vectors in the vector codebook 41 is formed by learning as in the conventional one, for example, in the present invention, one vector, that is most similar (distortion is small) to the vector $C_0$ among these vectors, is substituted by $C_0$, or $C_0$ is simply added.

There are several methods for finding the vector $C_0$. As one of them, since the spectrum envelope of the input acoustic signal normally becomes flat at the silent interval or the stationary noise interval, in the case of p-dimensional LSP parameter vector F, for example, 0 to π are divided equally by p+1, and p values having the substantially equal interval in size, such as π/(1+p), 2π/(1+p), . . . , π/(1+p), may be used as the LSP parameter vector. Alternatively, from the actual LSP parameter vector F at the silent interval and the stationary noise interval, it can be found by $C_0 = F - y_{ave}$. Or, the LSP parameter in the case of inputting the white noise or Hoth noise may be used as the parameter vector F, to find $C_0 = F - y_{ave}$. Incidentally, in general, the mean vector $y_{ave}$ of the LSP parameter among the entire speech signal is found as a mean vector of all of the vectors for learning when the code vector x of the vector codebook 41 is learned.

The following Table 1 show examples of the ten-dimensional vectors $\underline{C_0}$, $\underline{y}_{ave}$, and $\underline{F}$ wherein the LSP parameters at the silent interval or the stationary noise interval are normalized between 0 to π when p=10 dimensional LSP parameters are used as the acoustic parameters.

TABLE 1

| p | $C_0$ | $y_{ave}$ | F |
|---|---|---|---|
| 1 | 0.0498613038 | 0.250504841 | 0.300366 |
| 2 | 0.196914087 | 0.376541460 | 0.573456 |
| 3 | 0.274116971 | 0.605215652 | 0.879333 |
| 4 | 0.222466032 | 0.923759106 | 1.146225 |
| 5 | 0.192227464 | 1.24066692 | 1.432894 |
| 6 | 0.170497624 | 1.54336668 | 1.713864 |
| 7 | 0.139565958 | 1.85979861 | 1.999365 |
| 8 | 0.177638442 | 2.10739425 | 2.285031 |
| 9 | 0.165183997 | 2.40568568 | 2.570870 |
| 10 | 0.250504841 | 2.68495222 | 2.856472 |

The vector $\underline{F}$ is the example of the code vector of the LSP parameter representing the silent interval and the stationary noise interval written into the codebook according to the present invention. Values of the elements of this vector are increased at substantially constant interval, and this means that the frequency spectrum is substantially flat.

Second Embodiment

Figure 4:
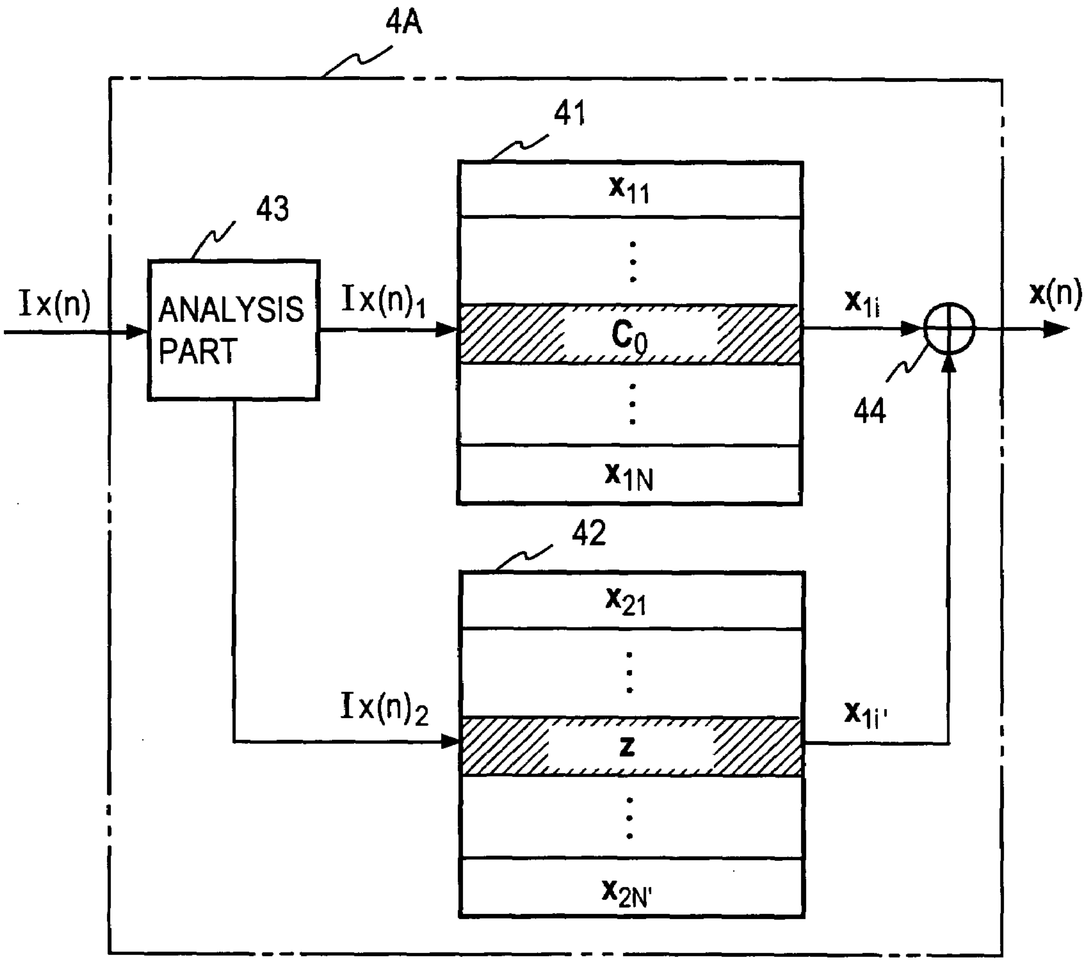
FIG. 4 is a diagram showing an example of a configuration of a vector codebook according to the present invention in case of a multi stage structure.

FIG. 4 shows another example of the configuration of the vector codebook 14A of the LSP parameter encoder of FIG. 1 or the vector codebook 24A of the LSP parameter decoding device of FIG. 2, shown as a codebook 4A in case two-stage vector codebook is used. A first-stage codebook 41 stores N pieces of p-dimensional code vectors $x_{11}, \ldots, x_{1N}$, and a second-stage codebook 42 stores N' pieces of p-dimensional code vectors $x_{21}, \ldots, x_{2N'}$.

Firstly, when the index Ix(n) specifying the code vector is inputted, the index Ix(n) is analyzed at a code analysis part 43, to thereby obtain an index $Ix(n)_1$ specifying the code vector at the first stage and an index $Ix(n)_2$ specifying the code vector at the second stage. Then, i-th and i'-th code vectors $x_{1i}$ and $x_{2i'}$ respectively corresponding to the indexes $Ix(n)_1$ and $Ix(n)_2$ of the respective stages are read out from the first-stage codebook 41 and the second-stage codebook 42, and the code vectors are added together at an adding part 44, to thereby output the added result as a code vector x(n).

In the case of the two-stage structure vector codebook, the code vector search is carried out by using only the first-stage codebook 41 for a predetermined number of candidate code vectors sequentially starting from the one having the smallest quantization distortion. This search is conducted by a combination with the set of the weighting coefficients of the coefficients codebook 14B shown in FIG. 1. Then, regarding the combinations of the first-stage code vectors as the respective candidates and the respective code vectors of the second-stage codebook, there is searched a combination of the code vectors in which the quantization distortion is the smallest.

In case the code vector is searched by prioritizing the first-stage codebook 41 as described above, the code vector $C_0$ (or F) is prestored as one of the code vectors in the first-stage codebook 41 of the multi stage vector codebook 4A, as well as the zero vector z is prestored as one of the code vectors in the second stage codebook 42. Accordingly, in case the code vector $C_0$ is selected from the codebook 41, the zero vector z is selected from the codebook 42. As a result, the present invention achieves the structure in which the code vector $C_0$ in the case of corresponding to the silent interval or the stationary noise interval can be outputted as the output of the codebook 4A from the adder 44. It may be structured such that in case the zero vector z is not stored and the code vector $C_0$ is selected from the codebook 41, the selection and addition from the codebook 42 are not conducted.

In case the search is conducted for all of the combinations of the respective code vectors in the first-stage codebook 41 and the respective code vectors in the second-stage codebook, the code vector $C_0$ and the zero vector z may be stored in either of the codebooks as long as they are stored in the separate codebooks from each other. It is highly possible that the code vector $C_0$ and the zero vector z are selected at the same time in the silent interval or the stationary noise interval, but they may not be always selected simultaneously in relation to the computing error and the like. In the codebooks of the respective stages, the code vector $C_0$ or the zero vector z becomes a choice for selection as same as the other code vectors.

The zero vector may not be stored in the second-stage codebook 42. In this case, if the vector $C_0$ is selected from the first-stage codebook 41, the selection of the code vector from the second-stage codebook 42 is not conducted, and it will suffice that the code $C_0$ of the codebook 41 is outputted as it is from the adder 44.

By forming the codebook 4A by the multi stage codebook as shown in FIG. 4, this structure is effectively the same as one in which the code vectors are provided only in the number of combinations of the selectable code vectors, and therefore, as compared with the case formed of single stage codebook only as shown in FIG. 3, there is an advantage that the size (the total number of the code vectors here) of the codebook can be reduced. Although FIG. 4 shows the case of the configuration formed of the two-stage vector codebooks 41 and 42, in case the number of the stages is 3 or more, it will suffice that codebooks only in the number corresponding to the additional stages may be added, and the code vectors are selected from the respective codebooks by indexes corresponding to the respective stages, to thereby carry out the vector synthesis of these vectors. Thus, it can be easily expanded.

Third Embodiment

Figure 5:
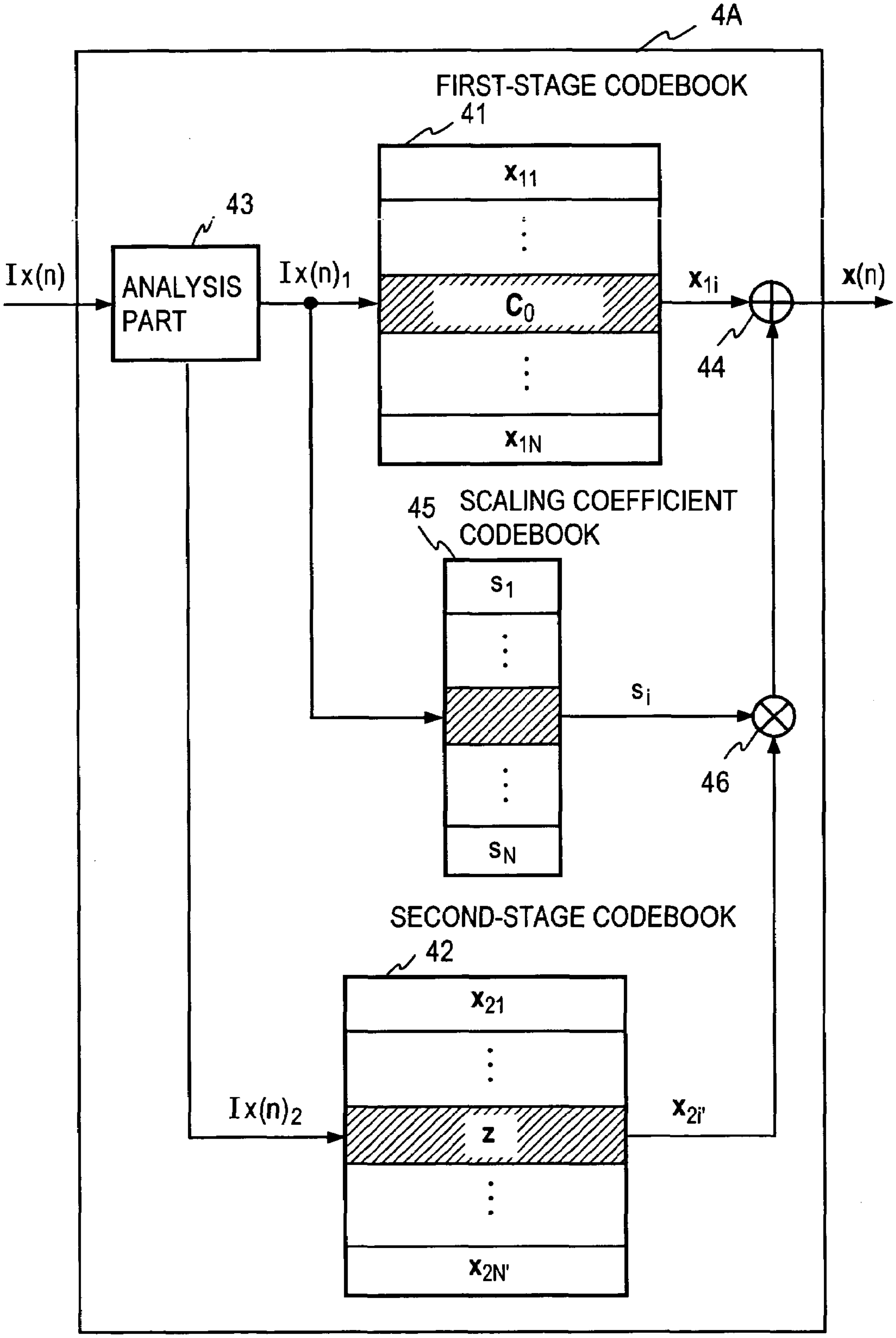
FIG. 5 is a diagram showing an example of a configuration of a vector codebook according to the present invention in the case that a scaling coefficient is adopted in the multi stage vector codebook.

FIG. 5 shows the case that in the vector codebook of the embodiment of FIG. 4, with respect to each code vector of the first-stage codebook 41, a predetermined scaling coefficient is multiplied by the code vector selected from the second-stage codebook 42, and the multiplied result is added to the code vector from the first-stage codebook 41 to be outputted. A scaling coefficient codebook 45 is provided to store scaling coefficients $S_1, \ldots, S_N$, for example, in the range of about 0.5 to 2, determined by learning in advance in correspondence to the respective vectors $x_{11}, \ldots, C_0, \ldots, x_{1N}$, and accessed by an index $Ix(n)_1$ common with the first-stage codebook 41.

Firstly, when the index Ix(n) specifying the code index is inputted, the index Ix(n) is analyzed at the code analysis part 43, so that the index $Ix(n)_1$ specifying the code vector of the first stage and the $Ix(n)_2$ specifying the code vector of the second stage are obtained. The code vector $x_{1i}$ corresponding to $Ix(n)_1$ is read out from the first-stage codebook 41. Also, from the scaling coefficient codebook 45, the scaling coefficient $s_i$ corresponding to the read index $Ix(n)_1$. Next, the code vector $x_{2i'}$ corresponding to the $Ix(n)_2$ is read out from the second-stage codebook 42, and in a multiplier 46, the scaling coefficient $s_i$ is multiplied by the code vector $x_{2i'}$ from the second-stage codebook 42. The vector obtained by the multiplication and the code vector $x_{1i}$ from the first-stage codebook 41 are added together at the adding part 44, and the added result is outputted as the code vector x(n) from the codebook 4A.

Also, in this embodiment, upon searching the code vector, firstly only the first-stage codebook 41 is used to search a predetermined number of the candidate code vectors sequentially starting from the one having the smallest quantization distortion. Then, regarding combinations of the respective candidate code vectors and the respective code vectors of the second codebook 42, a combination thereof having the smallest quantization distortion is searched. In this case, with respect to the multi stage vector codebook 4A with the scaling coefficients, the vector $C_0$ is prestored as one cod vector in the first-stage codebook 41, and the zero vector z is prestored as one of the code vectors in the second-stage codebook 42 as well. Similarly to the case in FIG. 4, if the search is conducted for all of the combinations between the code vectors of two codebooks 41 and 42, the code vector $C_0$ and the zero vector z may be stored either of the codebooks as long as they are stored in the separate codebooks from each other. Alternatively, as in the embodiments described previously, the zero vector z may not be store. In that case, if the code vector $C_0$ is selected, the selection and addition from the codebook 42 are not conducted.

As described above, the code vector in case of corresponding to the silent interval or the stationary noise interval can be outputted. Although it is highly possible that the code vector $C_0$ and the zero vector z are selected at the same time in the silent interval or the stationary noise interval, they may not be always selected simultaneously in relation to the computing error and the like. In the codebooks of the respective stages, the code vector $C_0$ or the zero vector z becomes a choice for selection as same as the other code vectors. As in the embodiment of FIG. 5, by using the scaling coefficient codebook 45, this structure is effectively the same as one in which the second-stage codebook is provided only in the number N of the scaling coefficients, and therefore, there is an advantage that the coding with much smaller quantization distortion can be achieved.

Fourth Embodiment

Figure 6:
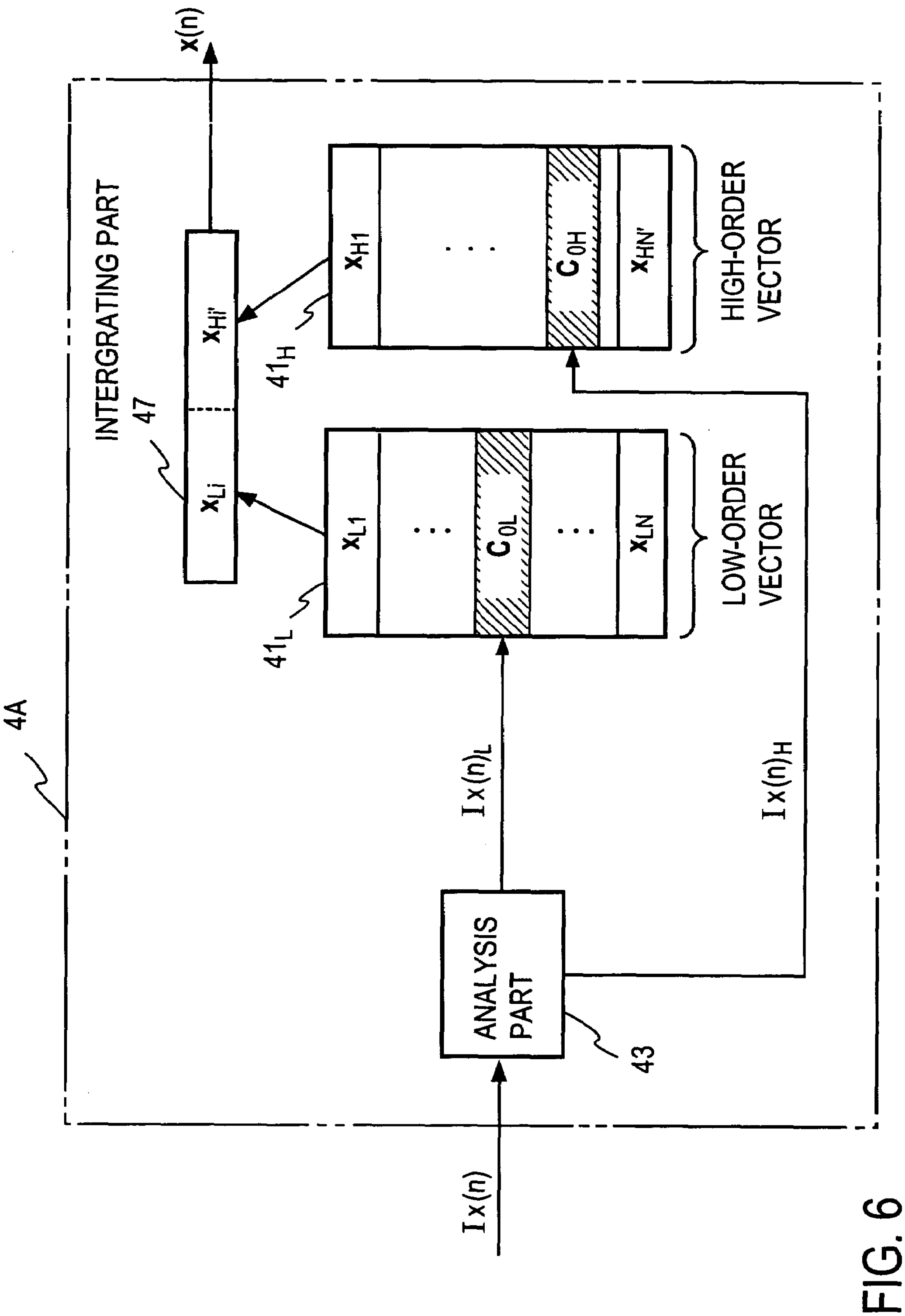
FIG. 6 is a diagram showing an example of a configuration of vector codebook according to the present invention in the case of being formed of a split vector codebook.

FIG. 6 is a case wherein the vector codebook 14A of the parameter coding device of FIG. 1 or the vector codebook 24A of the parameter decoding device of FIG. 2 are formed as a split vector codebook 4A, to which the present invention is applied. Although the codebook of FIG. 6 is formed of half-split vector codebook, in case the number of divisions is three or more, it is possible to expand similarly, so that achieving the case wherein the number of divisions is 2 will be described here The codebook 4A includes a low-order vector codebook $\mathbf{41}_L$ storing N pieces of low-order code vectors $x_{L1}, \ldots, x_{LN}$, and a high-order vector codebook $\mathbf{41}_H$ storing N' pieces of high-order code vectors $x_{H1}, \ldots, x_{HN'}$. Supposing the output code vector is x(n), in the low-order and high-order codebooks $\mathbf{41}_L$ and $\mathbf{41}_H$, 1 to k- orders are defined as the low order and k+1to p-orders are defined as the high order among p-order, so that the codebooks are respectively formed of the vectors in the respective numbers of the dimensions. Namely, i-th vector of the low-order codebook $41_L$ is expressed by:

$$x_{Li}=(x_{Li1}, x_{Li2}, \ldots, x_{Lik}) \tag{9}$$

and i'-th vector of the high-order vector codebook $41_H$ is expressed by:

$$x_{Hi'}=(x_{Hi'k+1}, x_{Hi'k+2}, \ldots, x_{Hi'p}) \tag{10}$$

The inputted index Ix(n) is divided into $Ix(n)_L$ and $Ix(n)_H$, and corresponding to these $Ix(n)_L$ and $Ix(n)_H$, the low-order and high-order split vectors $x_{Li}$ and $x_{Hi'}$ are respectively selected from the respective codebooks $41_L$ and $41_H$, and these split vectors $x_{Li}$ and $x_{Hi'}$ are integrated at an integrating part 47, to thereby generate the output code vector x(n). In other words, supposing that the code vector outputted from the integrating part 47 is x(n), $$x(n)=(x_{Li1}, x_{Li2}, \ldots, x_{Lik}|x_{Hi'k+1}, x_{Hi'k+2}, \ldots, x_{Hi'p}) \tag{11}$$

is expressed.

In this embodiment, a low-order vector $C_{0L}$ of the vector $C_0$ is stored as one of the vectors of the low-order codebook $41_L$, and a high-order vector $C_{0H}$ of the vector $C_0$ is stored as one of the vectors of the high-order codebook $41_H$. As described above, there is achieved a structure which can output the following as the code vector in case of corresponding to the silent interval or the stationary noise interval:

$$C_0=(C_{0L}|C_{0H}) \tag{12}$$

Furthermore, depending on the case, the vector may be outputted as a combination of $C_{0L}$ and the other high-order vector, or a combination of the other low-order vector and $C_{0H}$. If the split vector codebooks $41_L$ and $41_H$ are provided as shown in FIG. 6, this is equivalent to providing the code vectors in the number of combinations between the two split vectors, there is an advantage that a size of each split vector codebook can be reduced.

Fifth Embodiment

Figure 7:
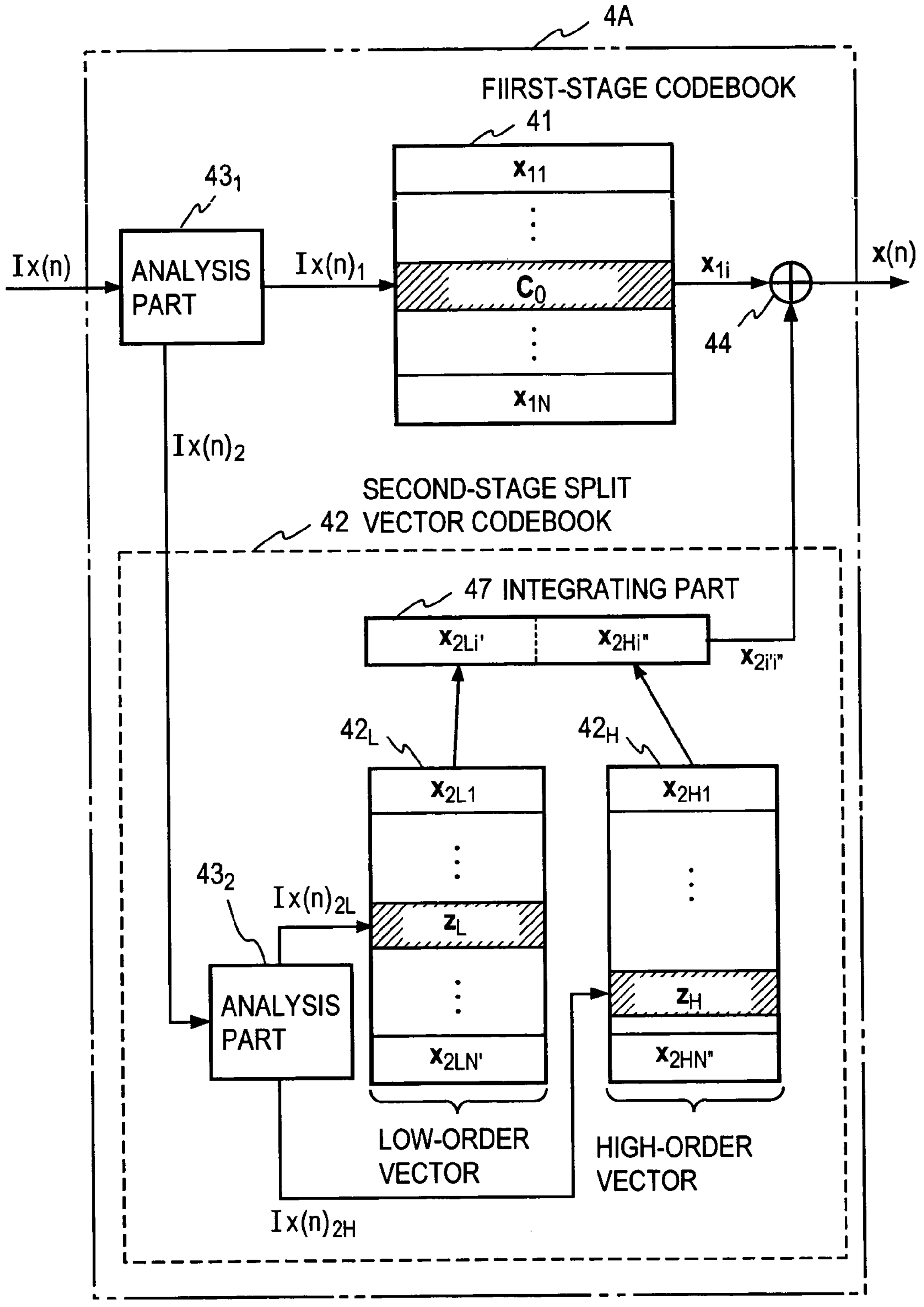
FIG. 7 is a diagram showing an example of a configuration of a vector codebook according to the present invention in the case that a second stage codebook is formed of the split vector codebook.

FIG. 7 shows a still another example of the configuration of the vector codebook 14A of the acoustic parameter coding device of FIG. 1 or the vector codebook 24A of the acoustic parameter decoding device of FIG. 2, wherein the codebook 4A is formed as a multi-stage and split vector codebook 4A. The codebook 4A is structured such that in the codebook 4A of FIG. 4, the second-stage codebook 42 is formed of a half-split vector codebook as same as one in FIG. 6.

The first-stage codebook 41 N pieces of code vectors $x_{11}, \ldots, x_{1N}$, a second-stage low-order codebook $42_L$ stores N' pieces of low-order code vectors $x_{2L1}, \ldots, x_{2LN'}$, and a second-stage high-order codebook $42_H$ stores N" pieces of high-order code vectors $x_{2H1}, \ldots, x_{2HN''}$.

In a code analysis part $43_1$, the inputted index Ix(n) is analyzed into an index $Ix(n)_1$ specifying the first-stage code vector, and an index $Ix(n)_2$ specifying the second-stage code vector. Then, i-th code vector $x_{1i}$ corresponding to the first-stage index $Ix(n)_i$ is read out from the first-stage codebook 41. Also, the second-stage index $Ix(n)_2$ is analyzed into $Ix(n)_{2L}$ and $Ix(n)_{2H}$, and by $Ix(n)_{2L}$ and $Ix(n)_{2H}$, the respective i'-th and i"-th split vectors $x_{2Li'}$ and $x_{2Hi''}$ of the second-stage low-order split vector codebook $42_L$ and the second-stage high-order split vector codebook $42_H$ are selected, and these selected split vectors are integrated at the integrating part 47, to thereby generate the second-stage code vector $x_{2i'i''}$. At the adding part 44, the first-stage code vector $x_{1i}$ and the second-stage integrated vector $x_{2i'i''}$ are added together, to be outputted as the code vector x(n).

In this embodiment, as in the embodiments of FIG. 4 and FIG. 5, the vector $C_0$ is stored as one of the vectors of the first-stage codebook 41, and split zero vectors $Z_L$ and $Z_H$ are stored respectively as one of the vectors of the low-order split vector codebook $42_L$ of the second-stage split codebook 42 and one of the vectors of the high-order split vector codebook $42_H$ of the second-stage split codebook 42. As structured as above, there is achieved a structure of outputting the code vector in case of corresponding to the silent interval or the stationary noise interval. The number of the stages of the codebooks may be three or more. Also, the split vector codebook can be used for any of the stages, and the number of the split codebooks per one stage is not limited to two. Furthermore, if the search is conducted regarding the code vectors of all of the combination between the first-stage codebook 41 and the second-stage codebooks $42_L$ and $42_H$, the vector $C_0$ and the split zero vectors $Z_L$ and $Z_H$ may be stored any of the codebooks of the different stages from each other. Alternatively, as in the second and third embodiments, storing the split zero vectors may be omitted.

In case they are not stored, the selection and addition from the codebooks $42_L$ and $42_H$ are not carried out at the time of selecting the vector $C_0$.

Sixth Embodiment

Figure 8:
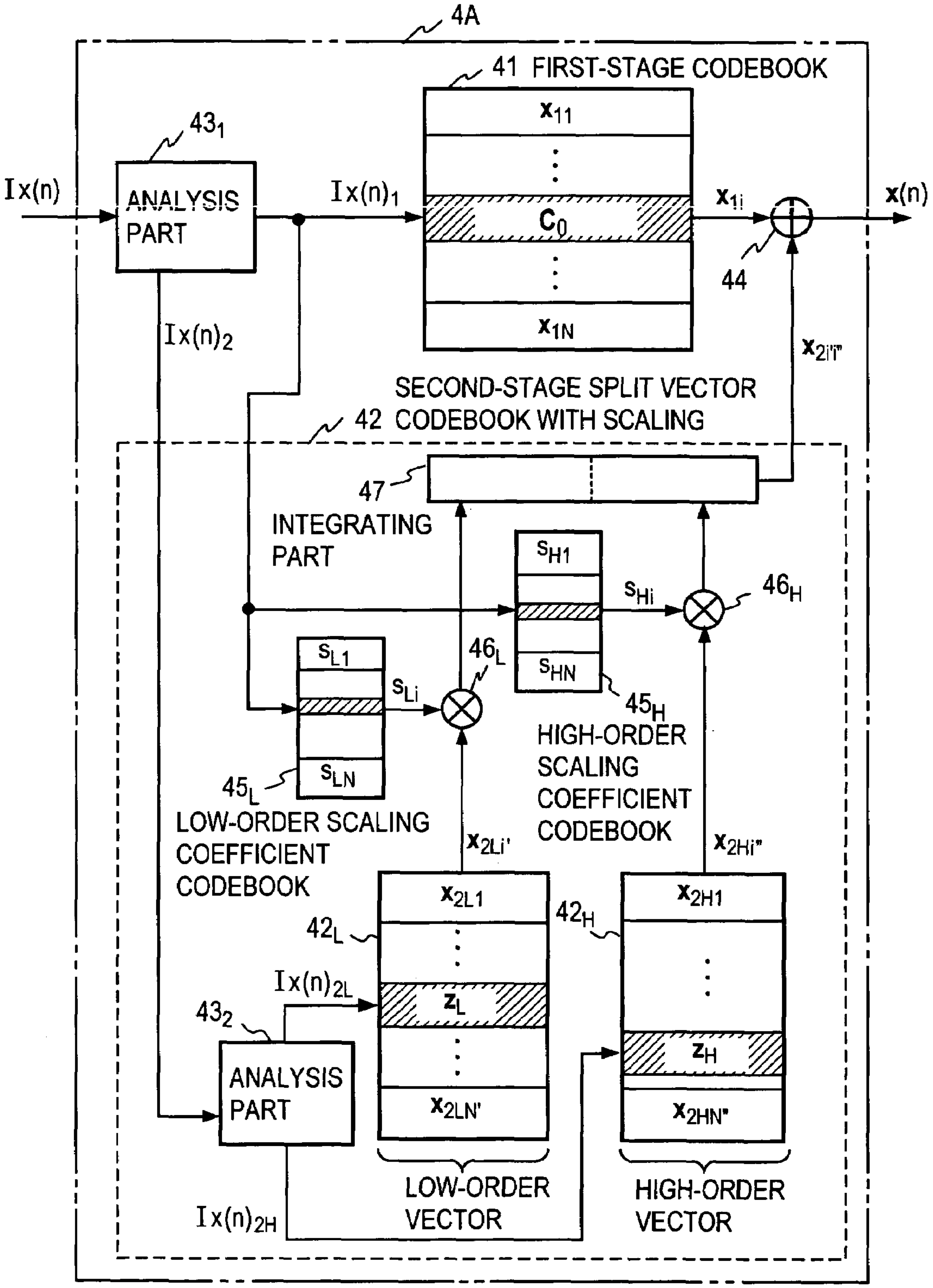
FIG. 8 is a diagram showing an example of a configuration of a vector codebook in the case that scaling coefficients are respectively adopted in two split vector codebooks in the codebook of FIG. 7.

FIG. 8 is a multi-stage and split vector codebook 4A with scaling coefficients, to which the present invention is applied, wherein the low-order codebook $42_L$ and the high-order codebook $42_H$ of the split vector codebook 42 in the vector codebook 4A of the embodiment of FIG. 7 is provided with scaling coefficient codebooks $45_L$ and $45_H$ similar to the scaling coefficient codebook 45 in the embodiment of FIG. 5. As coefficients by which the low-order and the high-order split vectors are multiplied respectively, N pieces of coefficients in the value of about 0.5 to 2, for example, are stored in the low-order scaling coefficient codebook $45_L$ and the high-order scaling coefficient codebook $45_H$.

At an analysis part $43_1$, the inputted index Ix(n) is analyzed into the index $Ix(n)_1$ specifying the first-stage code vector and the index $Ix(n)_2$ specifying the second-stage code vector. Firstly, the code vector $x_{1i}$ corresponding to index $Ix(n)_1$ is obtained from the first-stage codebook 41. Also, in correspondence with the index $Ix(n)_1$, a low-order scaling coefficient $S_{Li}$ and a high-order scaling coefficient $S_{Hi}$ are respectively read out from the low-order scaling coefficient codebook $45_L$ and the high-order scaling coefficient codebook $45_H$. Then, the index $Ix(n)_2$ is analyzed into an index $Ix(n)_{2L}$ and an index $Ix(n)_{2H}$ at an analysis part $43_2$, and respective split vectors $x_{2Li'}$ and $x_{2Hi''}$ of the second-stage low-order split vector codebook $42_L$ and the second-stage high-order split vector codebook $42_H$ are selected by these indexes $Ix(n)_{2L}$ and $Ix(n)_{2H}$. These selected split vectors are multiplied by the low-order and high-order scaling coefficients $S_{Li}$ and $S_{Hi}$ at multipliers $46_L$ and $46_H$, and the obtained multiplied vectors are integrated at an integrating part 47, to thereby generate a second-stage code vector $x_{2i'i''}$. The first-stage code vector $x_{1i}$ and the second-stage integrated vector $x_{2i'i''}$ are added together at the adder 44, and the added result is outputted as the code vector x(n).

In the multi-stage and split vector codebook 4A with scaling coefficients of the embodiment, the vector $C_0$ is stored as one of the code vectors in the first-stage codebook 41, and the split zero vectors $Z_L$ and $Z_H$ are respectively stored as the split vectors in the low-order split vector codebook $\mathbf{42}_L$ and the high-order split vector codebook $\mathbf{42}_H$ of the second-stage split vector codebook as well. Accordingly, there is achieved a configuration of outputting the code vector in the case of corresponding to the silent interval or the stationary noise interval. The number of the stages of the codebook may be three or more. In this case, two or more stages subsequent to the second-stage can be respectively formed of the split vector codebooks. Also, in either case, it is not limited to the number of the split vector codebooks per stage.

Seventh Embodiment

Figure 9:
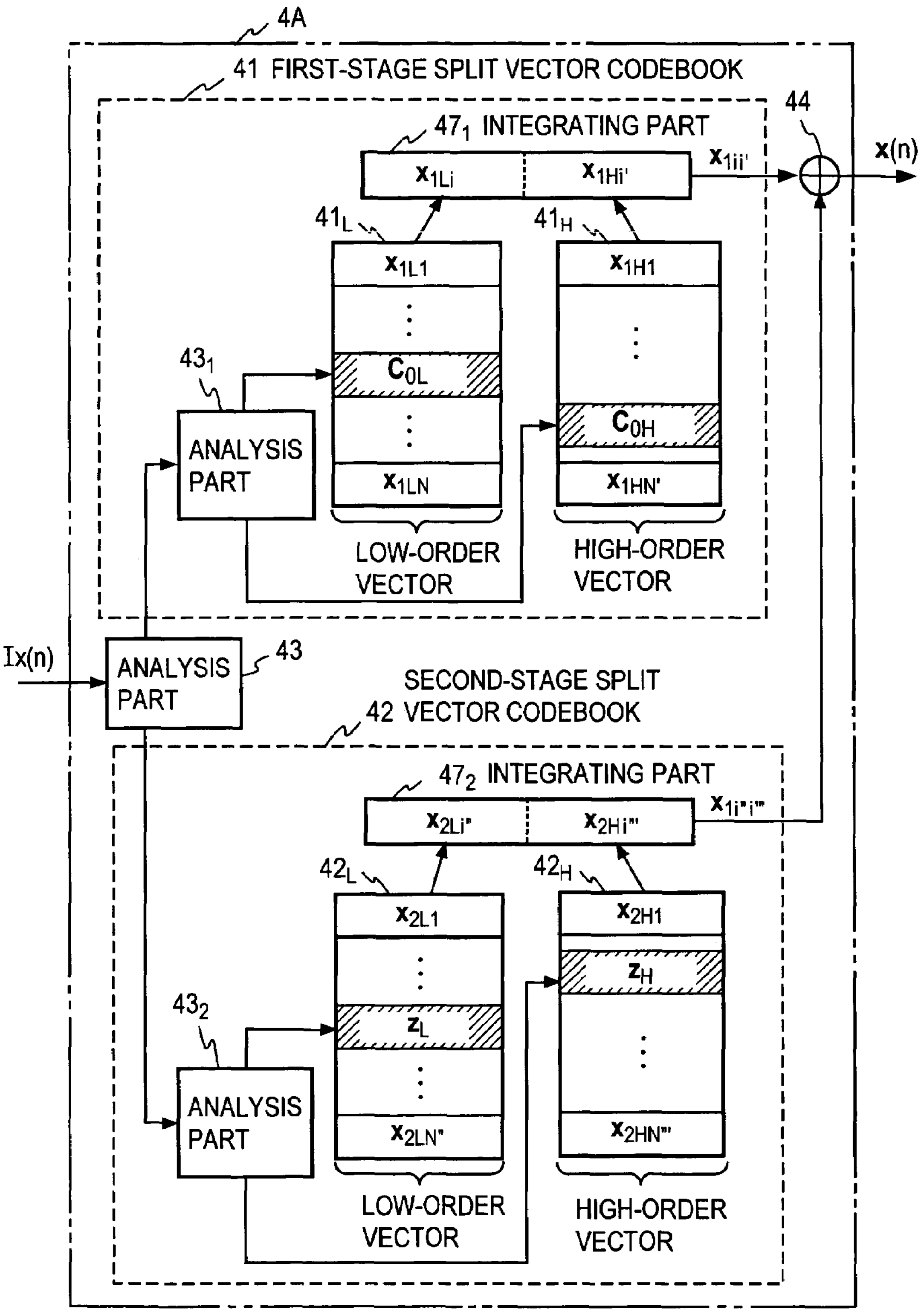
FIG. 9 is a diagram showing an example of a configuration of a vector codebook in the case that each stage in the multi stage codebook of FIG. 4 is structured as the split vector codebook.

FIG. 9 illustrates a still further example of a configuration of the vector codebook 14A of the acoustic parameter coding device of FIG. 1 of the vector codebook 24A of the acoustic parameter decoding device of FIG. 2, and the first-stage codebook 41 of the embodiment of FIG. 7 is also formed of split vector codebooks as in the embodiment of FIG. 6. In this embodiment, N pieces of high-order split vectors $x_{1L1}, \ldots, x_{1LN}$ are stored in the first-stage low-order codebook $\mathbf{41}_L$, and N' pieces of high-order split vectors $x_{1H1}, \ldots, x_{1HN'}$ are stored in the first-stage high-order codebook $\mathbf{41}_H$. N" pieces of low-order split vectors $x_{2L1}, \ldots, x_{2LN''}$ are stored in the second-stage low-order codebook $\mathbf{42}_L$, and N''' pieces of high-order split vectors $x_{2H1}, \ldots, x_{2HN'''}$ are stored in the second-stage high-order codebook $\mathbf{42}_H$.

At the code analysis part 43, the inputted index Ix(n) is analyzed into the index $Ix(n)_1$ specifying the first-stage code vector and the index $Ix(n)_2$ specifying the second-stage code vector. Respective i-th and i'th split vectors $x_{1Li}$ and $x_{1Hi'}$ of the first-stage split vector codebook $\mathbf{41}_L$ and the first-stage high-order codebook $\mathbf{41}_H$ are selected as vectors corresponding to the first-stage index $Ix(n)_1$, and the selected vectors are integrated at an integrating part $\mathbf{47}_1$, to thereby generate a first-stage integrated vector $x_{1ii'}$.

Also, similarly to the first stage, regarding the second-stage index $Ix(n)_2$, respective i"-th and i'''th split vectors $x_{2Li''}$ and $x_{2Hi'''}$ of the second-stage split vector codebook $\mathbf{42}_L$ and the second-stage high-order codebook $\mathbf{42}_H$ are selected, and the selected vectors are integrated at an integrating part $\mathbf{47}_2$, to thereby generate a second-stage integrated vector $x_{2i''i'''}$. At the adding part 44, the first-stage integrated vector $x_{1ii'}$ and the second-stage integrated vector $x_{2i''i'''}$ are added together, and the added result is outputted as the code vector x(n).

In this embodiment, similarly to the configuration of the split vector codebook of FIG. 6, at the first stage, the low-order split vector $C_{0L}$ of the vector $C_0$ is stored as one of the vectors of the first stage low-order codebook $\mathbf{41}_L$, and the high-order split vector $C_{0H}$ of the vector $C_0$ is stored as one of the vectors of the first-stage high-order codebook $\mathbf{41}_H$. In addition, the split zero vectors $Z_L$ and $Z_H$ are respectively stored as the respective ones of vectors of the low-order split vector codebook $\mathbf{42}_L$ of the second-stage split vector codebook 42 and the high-order split vector codebook $\mathbf{42}_H$ of the second stage. According to this configuration, there is achieved a configuration which enable to output the code vector in the case of corresponding to the silent interval or the stationary noise interval. Also in this case, the number of the multi stages is not limited to two, and the number of the split vector codebooks per stage is not limited to two.

Eighth Embodiment

Figure 10A:
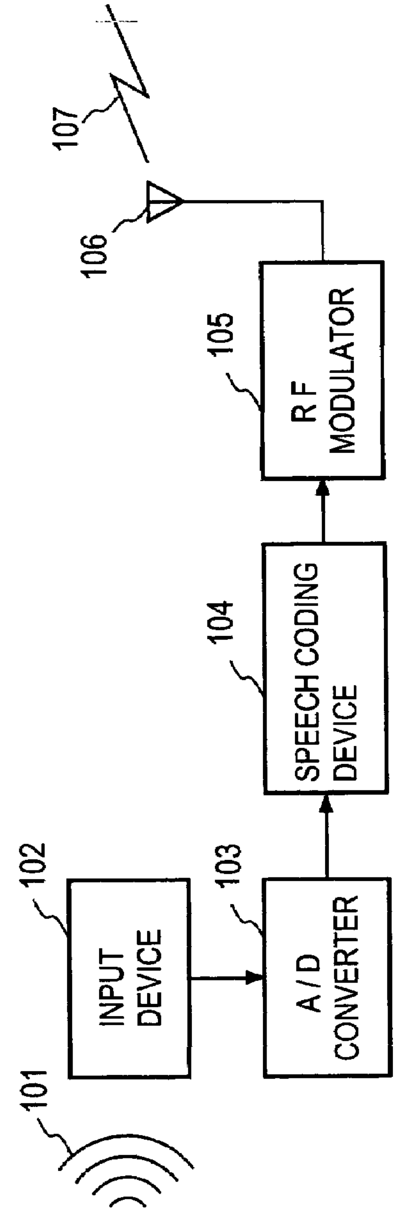
FIG. 10A is a block diagram showing an example of a configuration of a speech signal transmission device to which the coding method according to the present invention is applied.
Figure 10B:
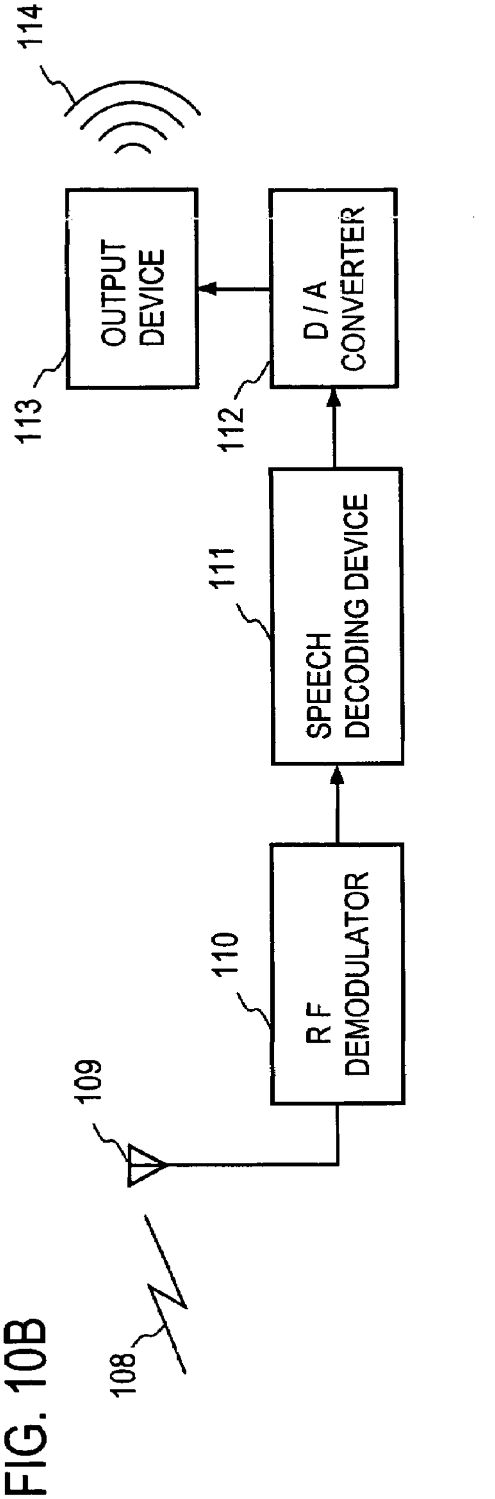
FIG. 10B is a block diagram showing an example of a configuration of a speech signal receiving device to which the decoding method according to the present invention is applied.

FIGS. 10A and 10B are block diagrams illustrating configurations of speech signal transmission device and receiving device to which the present invention is applied.

A speech signal 101 is converted into an electric signal by an input device 102, and outputted to an A/D converter 103. The A/D converter converts the (analog) signal outputted from the input device 102 into a digital signal, and output it to a speech coding device 104. The speech coding device 104 encodes the digital speech signal outputted from the A/D converter 103 by using a speech coding method, described later, and outputs the encoded information to an RF modulator 105. The RF modulator 105 converts the speech encoded information outputted from the speech coding device 104 into a signal to be sent out by being placed on a propagation medium, such as a radio wave, and outputs the signal to a transmitting antenna 106. The transmitting antenna 106 transmits the output signal outputted from the RF modulator 105 as the radio wave (RF signal) 107. The foregoing is the configuration and operations of the speech signal transmission device.

The transmitted radio wave (RF signal) 108 is received by a receiving antenna 109, and outputted to an RF demodulator 110.

Incidentally, the radio wave (RF signal) 108 in the figure constitutes the radio wave (RF signal) 107 as seen from the receiving side, and if there is no damping of signal or superposition of the noise in the propagation channel, the radio wave 108 constitutes the exactly same one as the radio wave (RF signal) 107. The RF demodulator 110 demodulates the speech encoded information from the RF signal outputted from the receiving antenna 109, and outputs the same to a speech decoding device 111. The speech decoding device 111 decodes the speech signal from the speech encoded information by using the speech decoding method, described later, and outputs the same to a D/A converter 112. The D/A converter 112 converts the digital speech signal outputted from the speech decoding device 111 into an analog electric signal and output it to an output device 113. The output device 113 converts the electric signal into vibration of air, and outputs as a sound wave 114 so that the human being can hear by ears. The foregoing is the configuration and operations of the speech signal receiving device.

By having at least one of the aforementioned speech signal transmission device and receiving device, a base station and mobile terminal device in the mobile communication system can be structured.

Figure 11:
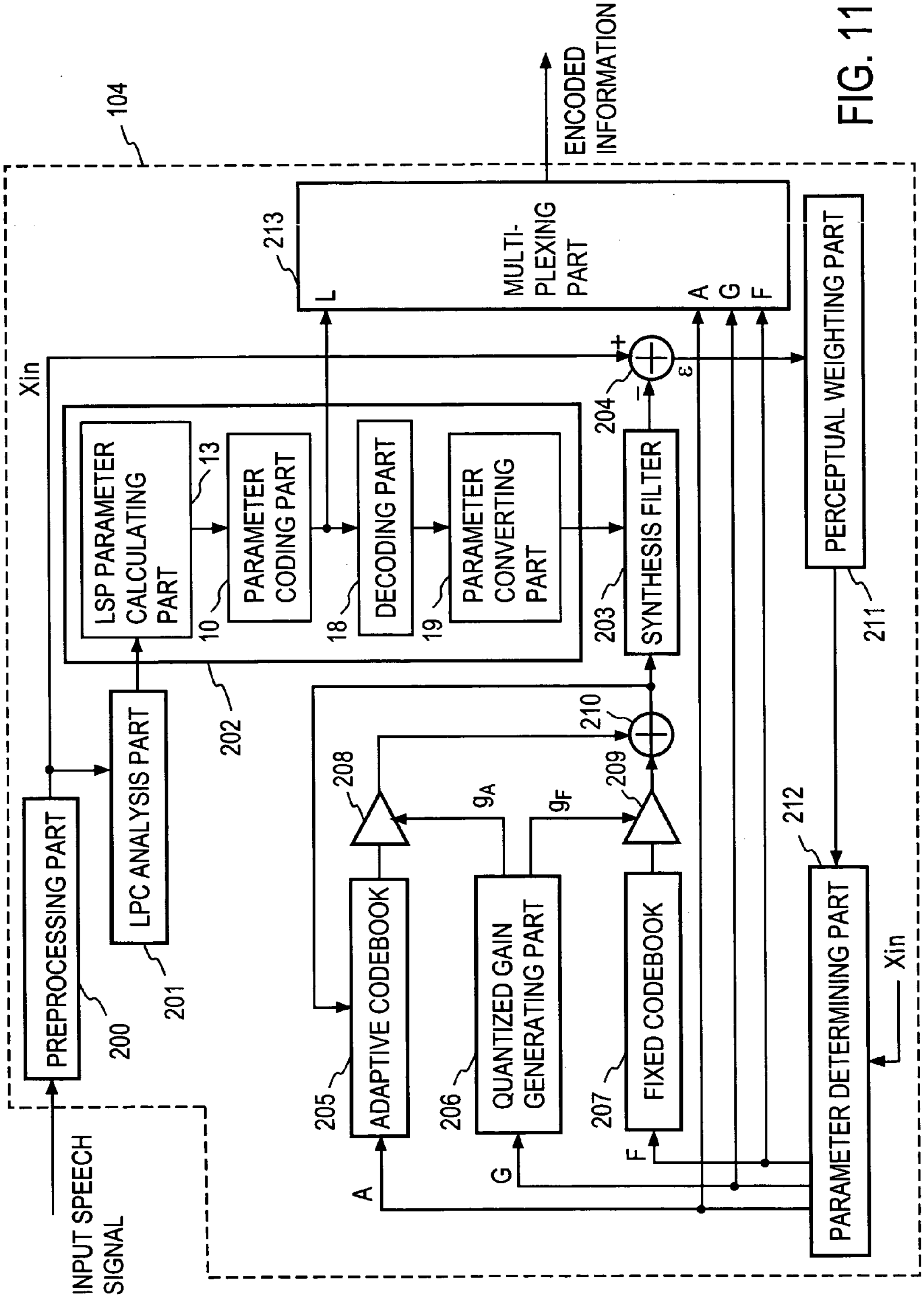
FIG. 11 is a diagram showing a functional configuration of a speech signal coding device to which the coding method according to the present invention is applied.

The aforementioned speech signal transmission device is characterized in the speech coding device 104. FIG. 11 is a block diagram illustrating a configuration of the speech coding device 104.

An input speech signal constitutes the signal outputted from the A/D converter 103 in FIG. 10A, and is inputted into a preprocessing part 200. In the preprocessing part 200, there are conducted a waveform shaping process and a preemphasis process, which might be connected to improvement of performances in high-pass filter processing for removing DC components or subsequent coding process, and a processed signal Xin is outputted to an LPC analysis part 201 and an adder 204, and then to a parameter determining part 212. The LPC analysis conducts the linear prediction analysis of Xin, and the analyzed result (linear predictive coefficient) is outputted to an LPC quantization part 202. The LPC quantization part 202 is formed of an LSP parameter calculating part 13, a parameter coding part 10, a decoding part 18, and a parameter converting part 19. The parameter coding part 10 has the same configuration as the parameter coding part 10 in FIG. 1 to which the vector codebook of the invention according to one of the embodiments of FIGS. 3 to 9 is applied. Also, the decoding part 18 has the same configuration as the decoding device in FIG. 2, to which one of the codebooks of FIGS. 3 to 9.

The linear predictive coefficient (LPC) outputted from the LPC analysis part 201 is converted into the LSP parameter at the LSP parameter calculating part 13, and the obtained LSP parameter is encoded at the parameter coding part 10 as explained with reference to FIG. 1. The vectors Ix(n) and Iw(n) obtained by encoding, that is, the code L showing the quantized LPC is outputted to a multiplexing part 213. At the same time, these codes Ix(n) and Iw(n) are decoded at the decoding part 18 to obtain the quantized LSP parameter, and the quantized LSP parameter is converted again into the LPC parameter at the parameter converting part 19, so that the obtained quantized LPC parameter is given to a synthesis filter 203. By having the quantized LPC as a filter coefficient, the synthesis filter 203 synthesizes the acoustic signal by a filter process with respect to a drive sound source signal outputted from an adder 210, and outputs the synthesized signal to the adder 204.

The adder 204 calculates an error signal $\epsilon$ between the aforementioned Xin and the aforementioned synthesized signal, and outputs the same to a perceptual weighting part 211. The perceptual weighting part 211 conducts the perceptual weighting with respect to the error signal $\epsilon$ outputted from the adder 204, and calculates a distortion of the synthesized signal with respect to Xin in a perceptual weighting area, to thereby output it to the parameter determining part 212. The parameter determining part 212 determines the signals that should be generated by an adaptive codebook 205, a fixed codebook 207 and a quantized gain generating part 206 such that the coding distortion outputted from the perceptual weighting part 211 becomes a minimum. Incidentally, not only minimizing the coding distortion outputted from the perceptual weighting part 211, but also using a method of minimizing another coding distortion by using the aforementioned Xin, to thereby determine the signal generated from the aforementioned three means, the coding performance can be further improved.

The adaptive codebook 205 conducted buffering of the sound source signal of the preceding frame n−1, that was outputted from the adder 210 in the past when the distortion was minimized, and cuts out the sound vector from a position specified by an adaptive vector code A thereof outputted from the parameter determining part 212, to thereby repeatedly concatenate the same until it becomes the length of one frame, resulting in generating the adaptive vector including a desired periodic component and outputting the same to a multiplier 208. In the fixed codebook 207, a plurality of fixed vectors each having the length of one frame are stored in correspondence with the fixed vector codes, and outputs a fixed vector, which has a form specified by a fixed vector code F outputted from the parameter determining part 212, to a multiplier 209.

The quantized gain generating part 206 respectively provides the multipliers 208 and 209 with an adaptive vector, that is specified by a gain code G outputted from the parameter determining part 212, a quantized adaptive vector gain $g_A$ and a quantized adaptive vector gain $g_F$ with respect to the fixed vector. In the multiplier 208, the quantized adaptive vector gain $g_A$ outputted from the quantized gain generating part 206 is multiplied by the adaptive vector outputted from the adaptive codebook 205, and the multiplied result is outputted to the adder 210. In the multiplier 209, the quantized fixed vector gain $g_F$ outputted from the quantized gain generating part 206 is multiplied by the fixed vector outputted from the fixed codebook 207, and the multiplied result is outputted to the adder 210.

In the adder 210, the adaptive vector and the fixed vector after multiplying with the gains are added together, and the added result is outputted to the synthesis filter 203 and the adaptive codebook 205. Finally, in the multiplexing part 213, the code L indicating the quantized LPC is inputted from the LPC quantization part 202; the adaptive vector code A indicating the adaptive vector, the fixed vector code F indicating the fixed vector, and the gain code G indicating the quantized gains are inputted from the parameter determining part 212; and these codes are multiplexed to be outputted as the encoded information to the transmission path.

Figure 12:
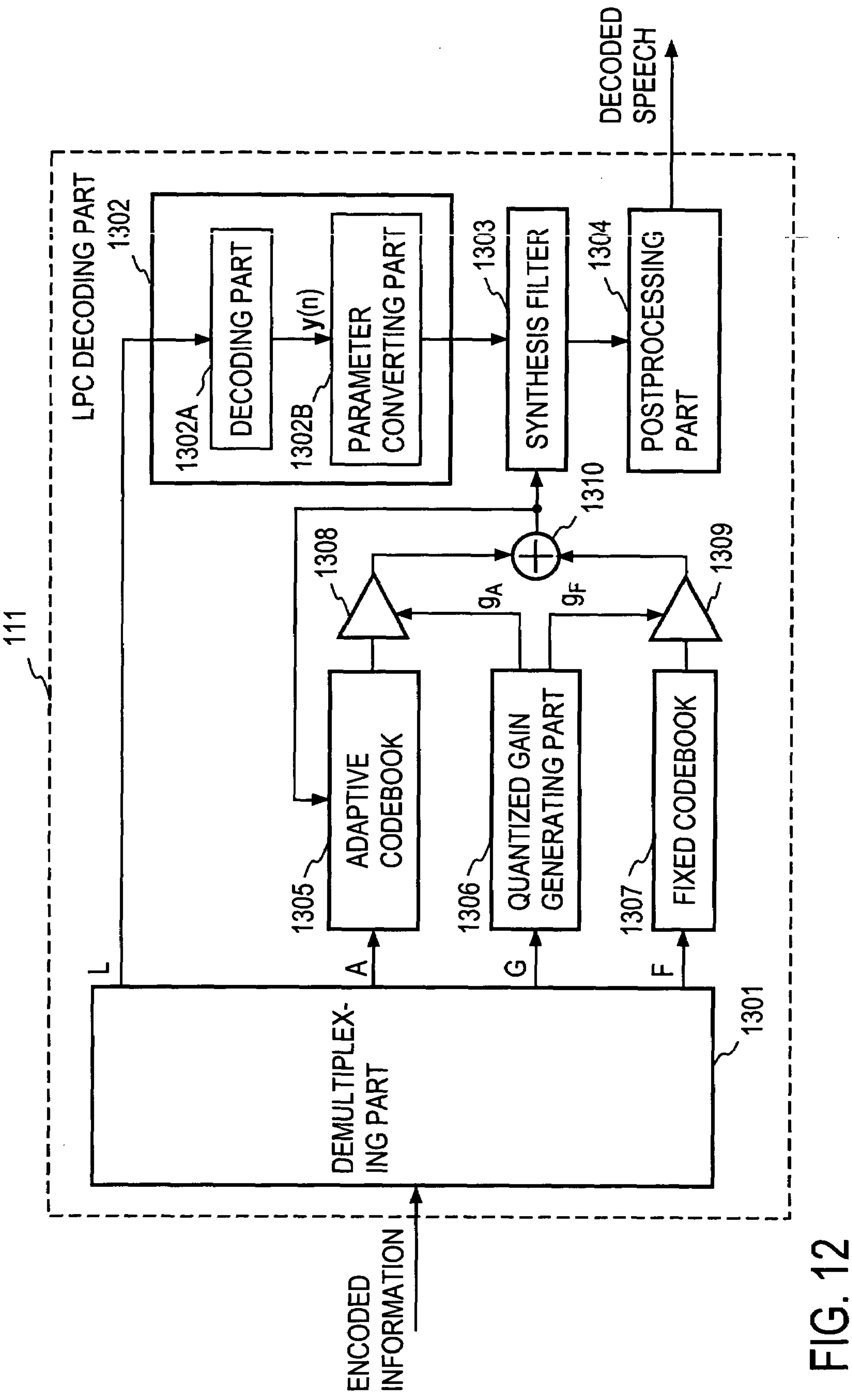
FIG. 12 is a diagram showing a functional configuration of a speech signal decoding device to which the decoding method according to the present invention is applied.

FIG. 12 is a block diagram illustrating a configuration of the speech decoding device 111 in FIG. 10B.

In the figure, regarding the encoded information outputted from the RF demodulator 110, the multiplexed encoded information is separated by a demultiplexing part 1301 into individual codes L, A, F and G. The separated LPC code L is given to an LPC decoding part 1302; the separated adaptive vector code A is given to an adaptive codebook 1305; the separated gain code G is given to a quantized gain generating part 1306; and the separated fixed vector code F is given to a fixed codebook 1307. The LPC decoding part 1302 is formed of a decoding part 1302A configured as same as that of FIG. 2, and a parameter converting part 1302B. The code L=(Ix(n), Iw(n)) provided from the demultiplexing part 1301 is decoded in the LSP parameter area by the decoding part 1302A as shown in FIG. 2, and converted into an LPC, to thereby be outputted to a synthesis filter 1303.

The adaptive codebook 1305 takes out an adaptive vector from a position specified by the adaptive vector code A outputted from the demultiplexing part 1301, and outputs the same to a multiplier 1308. The fixed codebook 1307 generates a fixed vector specified by the fixed vector code F outputted from the demultiplexing part 1301, and outputs the same to a multiplier 1309. The quantized gain generating part 1306 decodes the adaptive vector gain $g_A$ and the fixed vector gain $g_F$, which are specified by the gain code G outputted from the demultiplexing part 1301, and respectively output them to the multipliers 1308 and 1309. In the multiplier 1308, the adaptive code vector is multiplied by the aforementioned adaptive code vector gain $g_A$, and the multiplied result is outputted to an adder 1310. In the multiplier 1309, the fixed code vector is multiplied by the aforementioned fixed code vector gain $g_F$, and the multiplied result is outputted to the adder 1310. In the adder 1310, the adaptive vector and the fixed vector, which are outputted from the multipliers 1308 and 1309 after multiplying with the gains, are added together, and the added result is outputted to the synthesis filter 1303. In the synthesis filter 1303, by having the vector outputted from the adder 1310 as a drive sound source signal, the filter synthesis is conducted by using a filter coefficient decoded by the LPC decoding part 1302, and the synthesized signal is outputted to a postprocessing part 1304. The postprocessing part 1304 conducts a process for improving a subjective quality of the speech, such as formant emphasis or pitch emphasis, or conducts a process for improving a subjective quality of the stationary noise, and thereafter outputs as a final decoded speech signal.

Although the LSP parameter is used as the parameter equivalent to the linear predictive coefficient indicating the spectrum envelope in the aforementioned description, other parameters, such as α parameter, PARCOR coefficient and the like, can be used. In the case of using these parameters, since the spectrum envelope also becomes flat in the silent interval or the stationary noise interval, the computation of the parameter at these intervals can be conducted easily, and in the case of p-order α parameter, for example, it will suffice that 0-order is 1.0 and 1- to p-order is 0.0. Even in the case of using other acoustic parameters, a vector of the acoustic parameter determined to indicate substantially flat spectrum envelope will suffice. Incidentally, the LSP parameter is practical since the quantization efficiency thereof is good.

In the foregoing description, in the case that the vector codebook is structured as the multi-stage configuration, the vector $C_0$ may be expressed by two synthesis vectors, for example, $C_0=C_{01}+C_{02}$, and $C_{01}$ and $C_{02}$ may be stored in the codebooks of the different stages from each other.

Furthermore, the present invention is applied not only to coding and decoding of the speech signal, but also to coding and decoding of general acoustic signal, such as a music signal.

Figure 13:
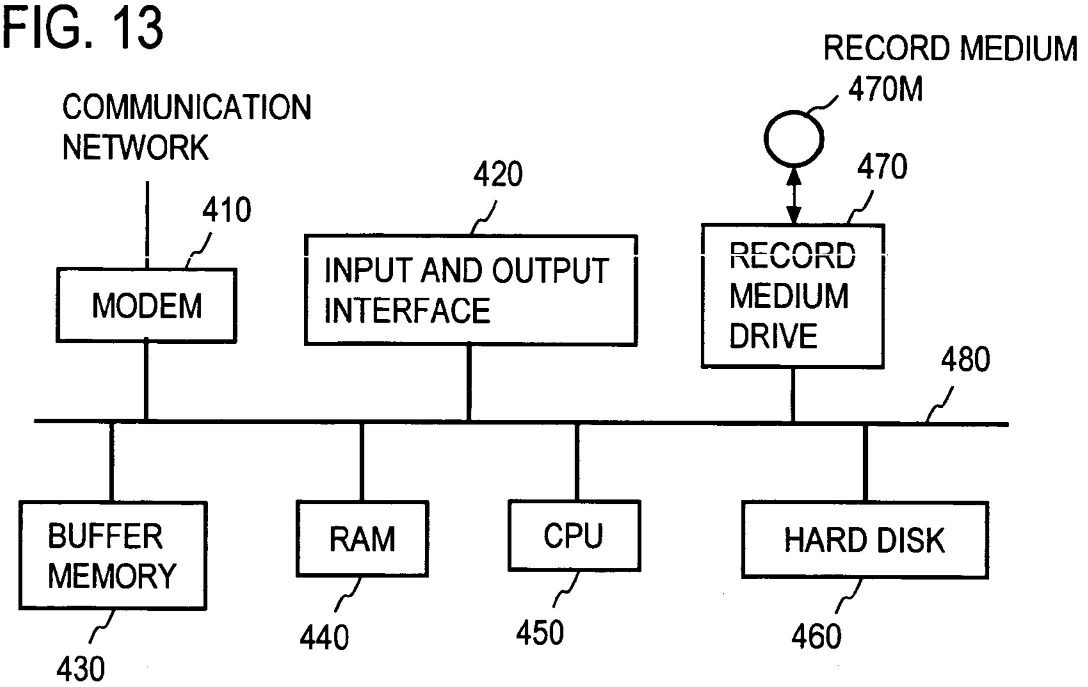
FIG. 13 is a diagram showing an example of a configuration in the case that the coding device and the decoding device according to the present invention are put into operation by a computer.

Also, the device of the invention can carry out coding and decoding of the acoustic signal by running the program by the computer. FIG. 13 illustrates an embodiment in which a computer conducts the acoustic parameter coding device and decoding device of FIGS. 1 and 2 using one of the codebooks of FIGS. 3 to 9, and the acoustic signal coding device and the decoding device of FIGS. 11 and 12 to which the coding method and decoding method thereof are applied.

The computer which carries out the present invention is formed of a modem 410 connected to a communication network; an input and output interface 420 for inputting and outputting the acoustic signal; a buffer memory 430 for temporarily storing a digital acoustic signal or the acoustic signal; a random access memory (RAM) 440 for carrying out the coding and decoding processes therein; a central processing unit (CPU) 450 for controlling the input and output of the data and program execution; a hard disk 460 in which the coding and decoding program is stored; and a drive 470 for driving a record medium 470M. These components are connected by a common bus 480.

As the record medium 470M, there can be used any kinds of record media, such as a compact disc CD, a digital video disc DVD, a magneto-optical disk MO, a memory card, and the like. In the hard disk 460, there is stored the program in which the coding method and the decoding method conducted in the acoustic signal coding device and decoding device of FIGS. 11 and 12 are expressed by procedures by the computer. This program includes a program, as a subroutine, for carrying out the acoustic parameter coding and decoding of FIGS. 1 and 2.

In the case of encoding the input acoustic signal, CPU 450 loads an acoustic signal coding program from the hard disk 460 into RAM 440; the acoustic signal imported into the buffer memory 430 is encoded by conducting the process per frame in RAM 440 in accordance with the coding program; and obtained code is send out as the encoded acoustic signal data via the modem 410, for example, to the communication network. Alternatively, the data is temporarily saved in the hard disk 460. Or, the data is written on the record medium 470M by the record medium drive 470.

In the case of decoding the input encoded acoustic signal, CPU 450 loads a decoding program from the hard disk 460 into RAM 440. Then, the acoustic code data is downloaded to the buffer memory 430 via the modem 410 from the communication network, or loaded to the buffer memory 430 from the record medium 470M by the drive 470. CPU 450 processes the acoustic code data per frame in RAM 440 in accordance with the decoding program, and obtained acoustic signal data is outputted from the input and output interface 420.

EFFECT OF THE INVENTION

Figure 14:
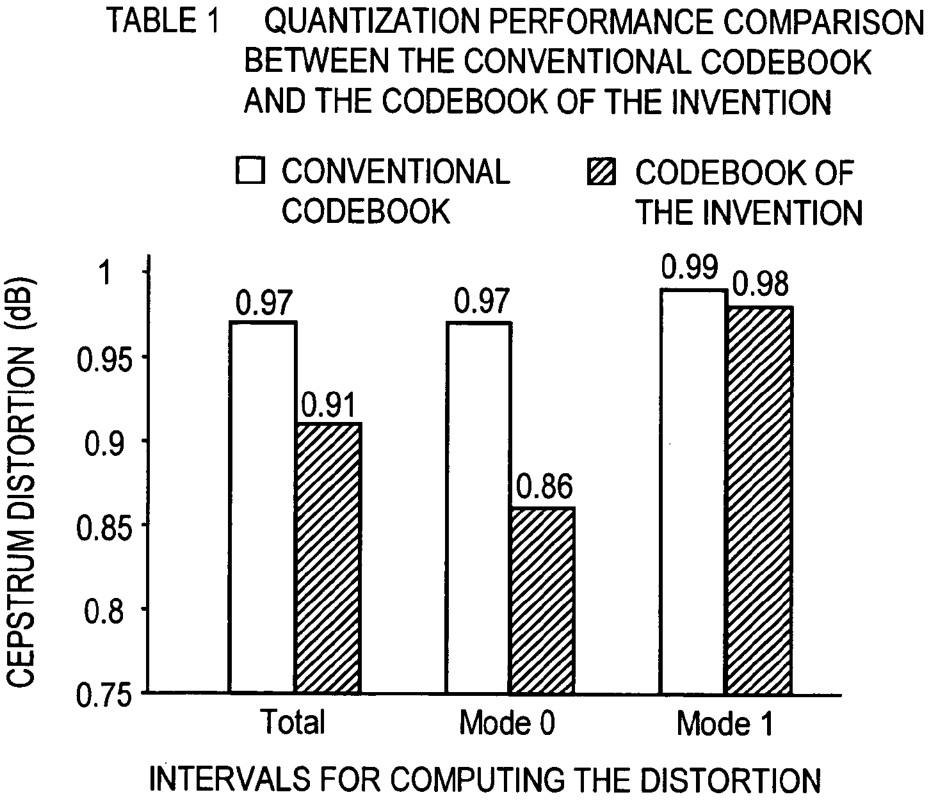
FIG. 14 is a graph for explaining effects of the present invention.

FIG. 14 shows quantization performances of the acoustic parameter coding devices in the case of embedding the zero vector $C_0$ at the silent interval and the zero vector z in the codebook according to the present invention and in the case of not embedding the vector $C_0$ in the codebook as in the conventional one. In FIG. 14, the axis of ordinate is cepstrum distortion, which corresponds to the log spectrum distortion, shown in decibel (dB). The smaller cepstrum distortion is, the better the quantization performance is. Also, as the speech intervals for computing the distortion, the mean distortions are found in the average of all of the intervals (Total), in the interval other than the silent interval and the stationary interval of the speech (Mode 0), and in the stationary interval of the speech (Mode 1). One in which the silent interval exists is Mode 0, and regarding the distortions therein, that of the proposed codebook is 0.11 dB lower, and it is understood that there is the effect by inserting the silent and zero vectors. Also, regarding the cepstrum distortion in Total, the distortion in case of using the proposed codebook is lower, and since there is no deterioration in the speech stationary interval, the effectiveness of the codebook according to the present invention is obvious.

As described above, according to the present invention, in coding wherein the parameter equivalent to the linear predictive coefficient is quantized by the weighted sum of the code vector of the current frame and the code vector outputted in the past, or the vector in which the above sum and mean vector found in advance are added together, as the vector stored in the vector codebook, the parameter vector corresponding to the silent interval or the stationary noise interval, or a vector in which the aforementioned mean vector is subtracted from the parameter vector is selected as the code vector, and the code thereof can be outputted. Therefore, there can be provided the coding and decoding methods and the devices thereof in which the quality deterioration in these intervals is scarce.

The invention claimed is:

1. An acoustic parameter coding method, comprising:

(a) a step of calculating an acoustic parameter equivalent to a linear predictive coefficient showing a spectrum envelope characteristic of an acoustic signal for every frame of a predetermined length of time;

(b) a step of multiplying a code vector outputted in at least one frame in the closest past selected from a vector codebook for storing a plurality of code vectors in correspondence with an index representing said code vectors and a code vector selected in a current frame respectively with a set of weighting coefficients selected from a coefficient codebook for storing one or more sets of weighting coefficients in correspondence with an index representing the weighting coefficients, wherein multiplied results are added to generate a weighted vector and a vector including a component of said weighted vector is found as a candidate of a quantized acoustic parameter with respect to said acoustic parameter of the current frame; and (c) a step of determining the code vector of the vector codebook and the set of the weighting coefficients of the coefficient codebook by using a standard such that a distortion of said candidate of the quantized acoustic parameter with respect to the calculated acoustic parameter becomes a minimum, wherein an index showing the determined code vector and the determined set of the weighting coefficients are determined and outputted as a quantized code of the acoustic parameter.

2. In the coding method according to claim 1, wherein said vector codebook includes a vector having a component of an acoustic parameter vector showing a substantially flat spectrum envelope as one of the stored code vectors.

3. In the coding method according to claim 2, said vector codebook is formed of codebooks in plural stages each storing a plurality of vectors in correspondence with an index representing the vectors, a codebook at one stage of said codebooks in the plural stages stores said vector including the component of the acoustic parameter vector showing the substantially flat spectrum envelope as one of the stored vectors, another codebook at another stage of the codebooks in the plurality of stages stores a zero vector as one of the stored vectors, and said step (b) includes a step of respectively selecting vectors from the codebooks in the plural stages and adding the selected vectors together to thereby output an added result as said vector selected in the current frame.

4. In the coding method according to claim 2, said vector codebook is formed of codebooks in plural stages each storing a plurality of vectors in correspondence with an index representing the vectors, a codebook at one stage of the codebooks in the plural stages stores said vector including the component of the acoustic parameter vector showing the substantially flat spectrum as one of the stored vectors, said step (b) further includes a step of respectively selecting vectors from the codebooks in the plural stages when a code vector other than said vector including the parameter vector is selected from the codebook at said one stage of the codebooks in the plural stages and adding the selected vectors together to thereby output an added result as the code vector selected in the current frame, wherein in case said vector including the component of the acoustic parameter vector showing the substantially flat spectrum envelope is selected from the codebook at said one stage, said vector including the component of the acoustic parameter vector showing the substantially flat spectrum envelope is outputted as said vector selected in the current frame.

5. In the coding method according to claim 3 or 4, a codebook of at least one of the stages of the codebooks in the plural stages includes a plurality of split vector codebooks for divisionally storing a plurality of split vectors in which dimensions of code vectors are divided in plural, and an integrating part for integrating the split vectors outputted from the plurality of split vector codebooks to thereby output the same as an output vector of the codebook of the corresponding stage.

6. In the coding method according to claim 3 or 4, said vector including the component of the acoustic parameter vector showing the substantially flat spectrum envelope is a vector generated by subtracting a mean vector of parameters equivalent to the linear predictive coefficient in an entirety of the acoustic signal and found in advance from said parameter vector equivalent to the linear predictive coefficient.

7. In the coding method according to any one of claims 3 and 4, said steps (b) and (c) collectively include firstly a step of searching a predetermined number of code vectors such that a distortion due to the code vector selected from the codebook of said one stage is a minimum, and subsequently a step of finding said distortions for all of combinations between said predetermined number of the code vectors and code vectors each being selected one by one from codebooks of the remaining stages, to thereby determine a code vector of a combination in which the distortion becomes the minimum.

8. In the coding method according to claim 2, said vector codebook includes codebooks in plural stages each storing a plurality of code vectors, and scaling coefficient codebooks respectively provided with respect to the respective codebooks of a second stage and stages after the second stage, each of said scaling coefficient codebooks storing scaling coefficients determined in advance in accordance with respective code vectors of a codebook at a first stage, a codebook at one stage of said codebooks in the plural stages stores said vector including the component of the acoustic parameter vector showing the substantially flat spectrum as one of the stored vectors, each of other codebooks of the remaining stages storing a zero vector, wherein said step (b) comprises:

a step of reading out scaling coefficients from the scaling codebooks on and after the second stage in correspondence with a code vector selected at the first stage, and multiplying the code vector selected at the first stage with each of the selected code vectors, to thereby output multiplied results as vectors of the respective stages; and a step of adding the outputted vectors of the respective stages to the vector at the first stage, to thereby output an added result as a code vector from the vector codebook.

9. In the coding method according to claim 8, a codebook at least one stage on and after the second stage among said codebooks in the plural stages is formed of a plurality of split vector codebooks divisionally storing a plurality of split vectors in which dimensions of the code vectors are divided in plural, said scaling coefficient codebook corresponding to the codebook of said at least one stage includes a plurality of scaling coefficient codebooks for the split vectors provided with respect to the plurality of split vector codebooks, and scaling coefficients for split vectors in which each of code vectors of the respective scaling coefficient codebooks for the split vectors is found in advance with respect to each of the code vectors of the codebook at the first stage, wherein said step (b) comprises:

a step of reading out a scaling coefficient for a split vector in correspondence with the index of the vector selected at the codebook of the first stage and respectively multiplying the same with split vectors respectively selected from the plurality of split vector codebooks of said at least one stage; and a step of integrating split vecotrs obtained by said multiplying to thereby output integrated results as output vectors of the codebooks at the respective stages.

10. In the coding method according to claim 2, said vector codebook is formed of a plurality of split vector codebooks in which dimensions of the code vectors are divided in plural, and an integrated part for integrating split vectors outputted from the split vector codebooks to thereby output a result as one code vector, said vector including the component of the acoustic parameter vector showing the substantially flat spectrum envelope is divisionally stored in each of the plurality of split vector codebooks as a split vector.

11. In the coding method according to claim 2, said vector including the component of the acoustic parameter vector showing the substantially flat spectrum envelope is a vector generated by subtracting a mean vector from said acoustic parameter vector showing the linear predictive coefficient, and said step (b) includes a step of adding said weighted vector to a mean vector of parameters equivalent to the linear predictive coefficient in an entirety of the acoustic signal found in advance, to thereby generate the vector including the component of the weighted vector.

12. In the coding method according to claim 2, the parameter equivalent to the linear predictive coefficient constitutes an LSP parameter.

13. An acoustic signal coding method for encoding an input acoustic signal, comprising:

(A) a step of encoding a spectrum characteristic of an input acoustic signal by using the acoustic parameter coding method according to claim 2;

(B) a step of using as an excitation signal a sound source vector generated based on an adaptive code vector from an to adaptive codebook for holding adaptive code vectors showing periodic components of an input acoustic signal therein and a fixed vector from a fixed codebook for storing a plurality of fixed vectors therein, and carrying out a synthesis filter process by a filter coefficient based on said quantized acoustic parameter to thereby generate a synthesized acoustic signal; and (C) a step of determining an adaptive code vector and a fixed vector selected from the fixed codebook and the adaptive codebook such that a distortion of the synthesized acoustic signal with respect to the input acoustic signal becomes small, and outputting an adaptive code and a fixed code respectively corresponding to the determined adaptive code vector and the fixed vector.

14. A program for conducting the acoustic parameter coding method according to any one of claims 3, 4, 8, 9 and 2 by a computer.

15. The coding method of claim 1 or 2, wherein said vector codebook includes codebooks in plural stages each storing a plurality of code vectors, and scaling coefficient codebooks respectively provided with respect to the respective codebooks of a second stage and stages after the second stage, each of said scaling coefficient codebooks storing scaling coefficients determined in advance in accordance with respective code vectors of a codebook at a first stage, and a codebook of at least one stage on or after the second stage among said codebooks in the plural stages is formed of a plurality of split vector codebooks divisionally storing a plurality of split vectors in which dimensions of the code vectors are divided in plural, said scaling coefficient codebook corresponding to the codebook of said at least one stage includes a plurality of scaling coefficient codebooks for the split vectors provided with respect to the plurality of split vector codebooks, and each storing scaling coefficients for split vectors predetermined in correspondence with the codebook at the first stage, wherein said step (b) comprises:

a step of reading out scaling coefficients from the scaling codebooks of the second and subsequent stages in correspondence with a code vector selected at the first stage, and multiplying the scaling coefficients with the selected code vectors, respectively, to thereby output multiplied results as vectors of the second and subsequent stages; and a step of adding the outputted vectors of the second and subsequent stages to the vector at the first stage, to thereby output an added result as a code vector from the vector codebook, wherein said step of outputting the vector from said codebook of said at least one stage comprises:

a step of reading out scaling coefficients from said plurality of scaling coefficient codebooks for a split vector in correspondence with the index of the vector selected at the codebook of the first stage and respectively multiplying the scaling coefficients with split vectors respectively selected from the plurality of split vector codebooks of said at least one stage to produce multiplied split vectors; and a step of integrating said multiplied split vectors to thereby output an integrated result as an output vector of the codebook at said at least one stage.

16. An acoustic parameter decoding method, comprising:

(a) a step of outputting a code vector corresponding to an index expressed by a code inputted for every frame and a set of weighting coefficients from a vector codebook and a coefficient codebook, said vector codebook storing a plurality of code vectors of an acoustic parameter equivalent to a linear predictive coefficient showing a spectrum envelope characteristic of an acoustic signal in correspondence with an index representing the code vectors, said coefficient codebook storing one or more sets of weighting coefficients in correspondence with an index representing said sets; and (b) a step of multiplying said code vector outputted from said vector codebook in at least one frame of the closest past and a code vector outputted from the vector codebook in a current frame respectively with said outputted set of the weighting coefficients, and adding multiplied results together to thereby generate a weighted vector, wherein a vector including a component of said weighted vector is outputted as a decoded quantized vector of the current frame.

17. In the decoding method according to claim 16, wherein said vector codebook includes a vector having a component of an acoustic parameter vector showing a substantially flat spectrum envelope as one of the code vectors stored therein.

18. In the decoding method according to claim 17, said vector codebook is formed of codebooks in plural stages each storing a plurality of vectors in correspondence with an index representing the vectors, a codebook at one stage of the codebooks in plural stages stores said vector including the component of the acoustic parameter vector showing the substantially flat spectrum envelope, codebooks of the other stages storing zero vectors as one of the vectors, and said step (b) includes a step of respectively outputting vectors specified by the index expressed by the inputted code from the codebooks in the plural stages, in which the outputted vectors are added and an added result is outputted as a code vector in the current frame.

19. In the decoding method according to claim 17, said vector codebook is formed of codebooks in plural stages each storing a plurality of vectors in correspondence with an index representing the vectors, a codebook at one stage of the codebooks in plural stages stores said vector including the component of the acoustic parameter vector showing the substantially flat spectrum envelope as one of the vectors, said step (b) includes a step of respectively selecting vectors from the codebooks in the plural stages when a code vector other than said vector including the component of the acoustic parameter vector showing the substantially flat spectrum envelope is selected from the codebook at said one stage of the codebooks in the plural stages and adding the selected vectors together to thereby output an added result as the code vector selected in the current frame, wherein in case said vector including the component of the acoustic parameter vector showing the substantially flat spectrum envelope is selected from the codebook at said one stage, said vector including the component of the acoustic parameter vector showing the substantially flat spectrum envelope is outputted as said vector of the current frame.

20. In the decoding method according to claim 18 or 19, a codebook, of at least one of the stages of the codebooks in the plural stages includes a plurality of split vector codebooks for divisionally storing a plurality of split vectors in which dimensions of code vectors are divided in plural, and an integrating part for integrating the split vectors outputted from the plurality of split vector codebooks to thereby output the same as an output vector of the codebook of the corresponding stage.

21. In the decoding method according to claim 18 or 19, said vector including the component of the parameter vector equivalent to the linear predictive coefficient is a vector generated by subtracting a mean vector of parameters equivalent to the linear predictive coefficient in an entirety of the acoustic signal and found in advance from said parameter vector equivalent to the linear predictive coefficient.

22. In the decoding method according to claim 17, said vector codebook includes codebooks in plural stages each storing a plurality of code vectors, and scaling coefficient codebooks respectively provided with respect to the respective codebooks of a second stage and stages after the second stage, each of said scaling coefficient codebooks stores scaling coefficients determined in advance in correspondence with code vectors of a codebook at a first stage, a codebook at one stage of said codebooks in the plural stages storing said vector including the component of the acoustic parameter vector showing the substantially flat spectrum as one of the stored vectors, each of other codebooks of the remaining stages storing a zero vector, wherein said step (b) comprises:

a step of reading out scaling coefficients from the scaling codebooks on and after the second stage in correspondence with a code vector selected at the first stage, and multiplying the code vector selected at the first stage with each of the selected code vectors, to thereby output multiplied results as vectors of the respective stages; and a step of adding the outputted vectors of the respective stages to the vector at the first stage, to thereby output an added result as a code vector from the vector codebook.

23. In the decoding method according to claim 22, a codebook at at least one stage on and after the second stage among said codebooks in the plural stages is formed of a plurality of split vector codebooks divisionally storing a plurality of split vectors in which dimensions of the code vectors are divided in plural, said scaling coefficient codebook corresponding to the codebook of said at least one stage includes a plurality of scaling coefficient codebooks for the split vectors provided with respect to the plurality of split vector codebooks, said scaling coefficient codebook for split vectors stores a plurality of scaling coefficients for split vectors in correspondence with the respective code vectors of the codebook of the first stage, wherein said step (b) comprises:

a step of reading out a scaling coefficient for a split vector in correspondence with the index of the vector selected at the codebook of the first stage and respectively multiplying the same with split vectors respectively selected from the plurality of split vector codebooks of said at least one stage, and a step of integrating split vectors obtained by said multiplying to thereby output integrated results as output vectors of the codebooks at the respective stages.

24. In the decoding method according to claim 17, said vector codebook is formed of a plurality of split vector codebooks in which dimensions of the code vectors are divided in plural, and an integrating part for integrating split vectors outputted from the split vector codebooks to thereby output a result as one code vector, said vector including the component of the acoustic parameter vector showing the substantially flat spectrum envelope is divided into split vectors to be divisionally stored in each of the plurality of split vector codebooks as a split vector.

25. In the decoding method according to claim 17, said vector including the component of the acoustic parameter vector showing the substantially flat spectrum envelope is a vector generated in advance by subtracting said mean vector from said acoustic parameter vector showing the linear predictive coefficient, and said step (b) includes a step of adding said weighted vector and a mean vector of parameters equivalent to the linear predictive coefficient in an entirety of the acoustic signal found in advance, to thereby generate the vector including the component of the weighted vector.

26. In the decoding method according to claim 17, the parameter equivalent to the linear predictive coefficient constitutes an LSP parameter.

27. An acoustic signal decoding device for decoding an input code and outputting an acoustic signal, comprising:

means for decoding an acoustic parameter equivalent to a linear predictive coefficient showing a spectrum envelope characteristic from an inputted code by using the acoustic parameter decoding method according to claim 17;

a fixed codebook for storing a plurality of fixed vectors therein;

an adaptive codebook for holding adaptive code vectors showing periodic components of a synthesized acoustic signal therein;

means for taking out a corresponding fixed vector from the fixed codebook and taking out a corresponding adaptive code vector from the adaptive codebook by an inputted adaptive code and an inputted fixed code, the means synthesizing the vectors and generating an excitation vector; and filtering means for setting a filter coefficient based on the acoustic parameter and reproducing an acoustic signal by the excitation vector.

28. An acoustic signal decoding method for decoding input codes and outputting an acoustic signal, comprising:

(A) a step of decoding an acoustic parameter equivalent to a linear predictive coefficient showing a spectrum envelope characteristic from inputted codes by using the acoustic parameter decoding method according to claim 17, (B) a step of taking out a corresponding adaptive code vector from an adaptive codebook for holding therein adaptive code vectors showing periodic components of an input acoustic signal by an adaptive code and a fixed code among the inputted codes, taking out a corresponding fixed vector from a fixed codebook for storing a plurality of fixed vectors therein, and synthesizing the adaptive code vector and the fixed vector to thereby generate an excitation vector; and (C) a step of carrying out a synthesis filter process of the excitation vector by using a filter coefficient based on the acoustic parameter, and reproducing a synthesized acoustic signal.

29. A program for conducting the acoustic parameter decoding method according to any one of claims 18, 19, 22, 26 and 17 by a computer.

30. The decoding method of claim 16 or 17, wherein said vector codebook includes codebooks in plural stages each storing a plurality of code vectors, and scaling coefficient codebooks respectively provided with respect to the respective codebooks of a second stage and stages after the second stage, each of said scaling coefficient codebooks stores scaling-coefficients determined in advance in correspondence with code vectors of a codebook at a first stage, wherein a codebook at at least one stage on or after the second stage among said codebooks in the plural stages is formed of a plurality of split vector codebooks divisionally storing a plurality of split vectors in which dimensions of the code vectors are divided in plural, said scaling coefficient codebook corresponding to the codebook of said at least one stage includes a plurality of scaling coefficient codebooks for the split vectors provided with respect to the plurality of split vector codebooks, each of said sealing coefficient codebooks for split vectors stores a plurality of scaling coefficients for split vectors in correspondence with the respective code vectors of the codebook of the first stage, wherein said step (b) comprises:

a step of reading out scaling coefficients from the scaling codebooks of the second and subsequent stages in correspondence with a code vector selected at the first stage, and multiplying the scaling coefficients with the selected code vectors, respectively, to thereby output multiplied results as vectors of the second and subsequent stages;

a step of adding the outputted vectors of the respective stages to the vector at the first stage, to thereby output an added result as a code vector from the vector codebook;

wherein said step of outputting the vector from said codebook of said at least one stage includes:

a step of reading out sealing coefficients from said plurality of scaling coefficient codebooks for a split vector in correspondence with the index of the vector selected at the codebook of the first stage and respectively multiplying the scaling coefficients with split vectors respectively selected from the plurality of split vector codebooks of said at least one stage to produce multiplied split vectors, and a step of integrating said multiplied split vectors to thereby output an integrated result as an output vector of the codebook at said at least one stage.

31. An acoustic parameter coding device, comprising:

parameter calculating means for analyzing an input acoustic signal for every frame and calculating an acoustic parameter equivalent to a linear predictive coefficient showing a spectrum envelope characteristic of the acoustic signal;

a vector codebook for storing a plurality of code vectors in correspondence with an index representing the vectors;

a coefficient codebook for storing one or more sets of weighting coefficients in correspondence with an index representing the coefficients;

quantized parameter generating means for multiplying a code vector with respect to a current frame outputted from the vector codebook and a code vector outputted in at least one frame of the closest past respectively with the set of the weighting coefficients selected from the coefficient codebook, said quantized parameter generating means adding results together a vector including a component of the generated weighted vector as a candidate of a quantized acoustic parameter with respect to the acoustic parameter in the current frame;

a distortion computing part for computing a distortion of the quantized acoustic parameter with respect to the acoustic parameter calculated at the parameter calculating means; and a codebook search controlling part for determining the code vector of the vector codebook and the set of the weighting coefficients of the coefficient codebook by using a standard such that the distortion becomes small, said codebook search controlling part outputting indexes respectively representing the determined code vector and the set of the weighting coefficients as codes of the acoustic parameter.

32. In the coding device according to claim 31, wherein said vector codebook includes a vector having a component of an acoustic parameter vector showing a substantially flat spectrum envelope.

33. In the coding device according to claim 32, said vector codebook includes codebooks in plural stages each storing a plurality of vectors in correspondence with an index representing the vectors, and an adder for adding the vectors outputted from the codebooks in the plural stages to thereby output the code vector, a codebook at one stage of the codebooks in the plural stages stores said vector including the component of the acoustic parameter vector showing the substantially flat spectrum envelope, and other codebooks at the other stages store a zero vector as one of the code vectors.

34. In the coding device according to claim 33, said codebook of at least one stage among the codebooks in the plural stages is formed of a plurality of split vector codebooks for divisionally storing a plurality of split vectors in which dimensions of the code vectors are divided in plural in correspondence with the index representing the split vectors, and an integrating part for integrating the split vectors outputted from the plurality of the split vector codebooks to thereby output a result as an output vector of the codebook of the stage.

35. In the coding device according to claim 32, said vector codebook comprises:

codebooks in plural stages each storing a plurality of code vectors in correspondence with an index representing the vectors;

scaling coefficient codebooks provided at respective codebooks on and after the second stage and storing scaling coefficients determined in advance by corresponding to the respective code vectors of the codebook of the first stage in correspondence with an index representing the coefficients;

multiplying means reading out a corresponding scaling coefficient from the scaling codebook with respect to the codebooks on and after the second stage, said multiplying means multiplying the code vector selected at the first stage with the code vector respectively selected from the codebooks on and after the second stage, to thereby output multiplied results as vectors of the respective stages; and an adder for adding vectors of the respective stages outputted from the multiplying means to the vector of the first stage, said adder outputting an added result as the code vector from the vector codebook;

wherein a codebook of one stage of the codebooks in the plural stages stores the vector including the component of the acoustic parameter vector showing said substantially flat spectrum envelope, and codebooks at the remaining stages store a zero vector.

36. In the coding device according to claim 35, a codebook of at least one stage on and after the second stage among said codebooks in the plural stages is formed of a plurality of split vector codebooks for divisionally storing a plurality of split vectors in which dimensions of the code vectors are divided in plural, wherein said scaling coefficient codebook corresponding to the codebook of said at least one stage comprises:

a plurality of scaling coefficient codebooks for split vectors storing a plurality of scaling coefficients for split vectors, which are provided in plural to correspond to the plurality of the split vector codebooks, respectively in correspondence with the code vectors of the first stage;

multiplying means for multiplying split vectors respectively outputted from the plurality of split vector codebooks of said at least one stage respectively with the scaling coefficient for split vectors corresponding to the index of the vector selected at the codebook of the first stage by reading out said scaling coefficient from the respective scaling coefficient codebooks for split vectors; and an integrating part for integrating multiplied results to thereby output a result as an output vector of the codebook of the corresponding stage.

37. In the coding device according to claim 32, said vector codebook is formed of a plurality of split vector codebooks for divisionally storing a plurality of split vectors in which dimensions of the code vectors are divided in plural, and an integrating part for integrating split vectors outputted from the split vector codebooks and outputting a result as one code vector; and said vector including the component of the acoustic parameter vector showing the substantially flat spectrum envelope is divided into split vectors to be stored one by one as the split vectors in the plurality of the split vector codebooks.

38. The coding device of claim 34 or 32, wherein said vector codebook comprises:

codebooks in plural stages each storing a plurality of code vectors in correspondence with an index representing the vectors;

scaling coefficient codebooks provided with respect to the codebooks of the second and subsequent stages, respectively, and each storing scaling coefficients predetermined for the respective code vectors of the codebook of the first stage in correspondence with indexes representing the scaling coefficients;

first multiplying means reading out scaling coefficients from the scaling codebooks of the second and subsequent stages in correspondence with the code vector selected from the codebook of the first stage, and multiplying the scaling coefficients with the code vectors selected from the codebooks of the second and subsequent stages, respectively, to thereby output multiplied results as vectors of the second and subsequent stages; and an adder for adding vectors of the second and subsequent stages outputted from the first multiplying means to the vector of the first stage, said adder outputting an added result as the code vector from the vector codebook;

wherein a codebook of at least one stage on or after the second stage among said codebooks in the plural stages is formed of a plurality of split vector codebooks for divisionally storing a plurality of split vectors in which dimensions of the code vectors are divided in plural, wherein said scaling coefficient codebook corresponding to the codebook of said at least one stage comprises:

a plurality of scaling coefficient codebooks for split vectors storing a plurality of scaling coefficients for split vectors, which are provided in plural to correspond to the plurality of the split vector codebooks, respectively in correspondence with the code vectors of the first stage;

second multiplying means for multiplying split vectors respectively selected from the plurality of split vector codebooks of said at least one stage respectively with the scaling coefficients for split vectors read out from said plurality of scaling coefficient codebooks for split vectors corresponding to the index of the vector selected at the codebook of the first stage to produce multiplied split vectors; and an integrating part for integrating said multiplied split vectors to thereby output a result as an output vector of the codebook of said at least one stage.

39. An acoustic parameter decoding device, comprising:

a vector codebook for storing a plurality of code vectors of an acoustic parameter equivalent to a linear predictive coefficient showing a spectrum envelope characteristic of an acoustic signal in correspondence with an index representing the code vectors, a coefficient codebook for storing one or more sets of weighting coefficients in correspondence with an index representing the weighting coefficients, and quantized parameter generating means for outputting one code vector from the vector codebook in correspondence with an index showing a code inputted for every frame, to thereby output a set of weighting coefficients from said coefficient codebook, said quantized parameter generating means multiplying the code vector outputted in a current frame and a code vector outputted in at least one frame of the closest past respectively with the set of the weighting coefficients outputted in the current frame, said quantized parameter generating means adding multiplied results together to thereby generate a weighted vector, said quantized parameter generating means outputting a vector including a component of the generated weighted vector as a decoded quantized acoustic parameter of the current frame.

40. In the decoding device according to claim 39, wherein said vector codebook stores a vector including a component of an acoustic parameter showing a substantially flat spectrum envelope as one of the code vectors.

41. In the decoding device according to claim 40, said vector codebook is formed of codebooks in plural stages each storing a plurality of vectors in correspondence with an index representing the plurality of vectors, and an adder for adding the vectors outputted from the codebooks in the plural stages to thereby output a code vector, and a codebook at one stage of the codebook in the plural stages stores the vector including the component of the acoustic parameter vector showing the substantially flat spectrum envelope as one of the vectors, and codebooks at other stages store a zero vector as one of the code vectors.

42. In the decoding device according to claim 41, a codebook of at least one stage among said codebooks in the plural stages includes a plurality of split vector codebooks for divisionally storing a plurality of split vectors in which dimensions of the code vectors are divided in plural, and an integrating part for integrating split vectors outputted from said plurality of split vector codebooks to thereby output a result as an output vector of a codebook of a corresponding stage.

43. In the decoding device according to claim 40, said vector codebook comprises:

codebooks in plural stages each storing a plurality of code vectors in correspondence with an index representing the code vectors;

scaling codebooks each being provided with respect to respective codebooks on and after a second stage and storing scaling coefficients determined in advance corresponding to code vectors of the codebook of a first stage in correspondence with an index representing the scaling coefficients;

multiplying means for reading out a corresponding scaling coefficient from the scaling codebook with respect to the codebook on and after the second stage in correspondence to the code vector selected at the first stage, said multiplying means multiplying the code vectors respectively selected from the codebooks on and after the second stage with the read out scaling coefficient to thereby output multiplied results as vectors of the respective stages; and an adder for adding the output vectors of the respective stages outputted from the multiplying means to the vector at the first stage, to thereby output an added result as a code vector from the vector codebook;

wherein a codebook of one stage among the codebooks in the plural stages stores said vector including the component of the acoustic parameter vector showing the substantially flat spectrum envelope, and codebooks of the remaining stages store a zero vector.

44. In the decoding device according to claim 43, a codebook at least one stage on and after the second stage among the codebooks in the plural stages is formed of a plurality of split codebooks for divisionally storing a plurality of split vectors in which dimensions of code vectors are divided in plural, and said scaling coefficient codebook corresponding to the codebook of said at least one stage comprises:

a plurality of scaling coefficient codebooks for split vectors storing scaling coefficients for a plurality of split vectors provided in plural corresponding to said plurality of split vector codebooks to respectively correspond to code vectors in the first stage;

multiplying means for reading out scaling coefficients for split vectors corresponding to an index of the vector selected at the codebook of the first stage from the respective scaling coefficient codebooks for the split vectors, said multiplying means respectively multiplying split vectors respectively outputted from said plurality of split vector codebooks of said at least one stage with the scaling coefficients for split vectors; and an integrating part for integrating multiplied results and outputting a result as an output vector of a codebook of a corresponding stage.

45. In the decoding device according to claim 40, the vector codebook comprises a plurality of split vector codebooks for to divisionally storing a plurality of split vectors in which dimensions of code vectors are divided in plural, and an integrating part for integrating split vectors outputted from the split vector codebooks to thereby output a result as one code vector, wherein:

the vector including the component of said acoustic parameter vector showing said substantially flat spectrum envelope is divided into split vectors each being divisionally stored in each of said plurality of vector codebooks.

46. The decoding device of claim 39 or 40, wherein said vector codebook comprises:

codebooks in plural stages each storing a plurality of code vectors in correspondence with an index representing the code vectors;

scaling codebooks each being provided with respect to the codebooks of the second and subsequent stages, respectively, and each storing scaling coefficients predetermined for the respective code vectors of the codebook of a first stage in correspondence with indexes representing the scaling coefficients;

first multiplying means for reading out corresponding scaling coefficient from the scaling codebooks with respect to the codebooks of the second and subsequent stages in correspondence to the code vector selected at the first stage, said multiplying means multiplying the code vectors respectively selected from the codebooks of the second and subsequent stages with the read out scaling coefficients to thereby output multiplied results as vectors of the second and subsequent stages; and an adder for adding the output vectors of the second and subsequent stages outputted from the first multiplying means to the vector at the first stage, to thereby output an added result as a code vector from the vector codebook;

wherein a codebook of at least one stage on or after the second stage among the codebooks in the plural stages is formed of a plurality of split codebooks for divisionally storing a plurality of split vectors in which dimensions of code vectors are divided in plural, and said scaling coefficient codebook corresponding to the codebook of said at least one stage comprises:

a plurality of scaling coefficient codebooks for split vectors storing scaling coefficients for a plurality of split vectors provided in plural corresponding to said plurality of split vector codebooks to respectively correspond to code vectors in the first stage;

second multiplying means for reading out scaling coefficients for split vectors from the respective scaling coefficient codebooks for the split vectors in correspondence with an index of the vector selected from the codebook of the first stage, and multiplying split vectors respectively outputted from said plurality of split vector codebooks of said at least one stage with the scaling coefficients for split vectors; and an integrating part for integrating multiplied results and outputting a result as an output vector of a codebook of said at least one stage.

47. An acoustic signal coding device for encoding an input acoustic signal, comprising:

means far encoding a spectrum characteristic of an input acoustic signal by using the acoustic parameter coding method according to claim 2;

an adaptive codebook for holding adaptive code vectors showing periodic components of said input acoustic signal therein;

a fixed codebook for storing a plurality of fixed vectors therein;

filtering means for inputting as an excitation signal a sound source vector generated based on the adaptive code vector from the adaptive codebook and the fixed vector from the fixed codebook, said filtering means synthesizing a synthesized acoustic signal by using a filter coefficient based on said quantized acoustic parameter; and means for determining an adaptive code vector and a fixed code vector respectively selected from the adaptive codebook and the fixed codebook such that a distortion of the synthesized acoustic signal with respect to said input acoustic signal to becomes small, said means outputting an adaptive code and a fixed code respectively corresponding to the determined adaptive code vector and the fixed vector.

48. An acoustic signal transmission device, comprising:

an acoustic input device for converting an acoustic signal into an electric signal;

an A/D converter for converting the signal outputted from the acoustic input device into a digital signal;

the acoustic signal decoding device according to claim 47 for encoding the digital signal outputted from the A/D converter;

an RF modulator for conducting a modulation process and the like with respect to encoded information outputted from the acoustic signal coding device; and a transmitting antenna for converting the signal outputted from the RF modulator into a radio wave and transmitting the same.

49. An acoustic signal receiving device, comprising:

a receiving antenna for receiving a reception radio wave;

an RF demodulator for conducting a demodulation process of the signal received by the receiving antenna;

the acoustic signal decoding device according to claim 27 for conducting a decoding process of information obtained by the RF demodulator;

a D/A converter for converting a digital acoustic signal decoded by the acoustic signal decoding device; and an acoustic signal outputting device for converting an electric signal outputted from the D/A converter into an acoustic signal.

* * * * *